US012316124B2

(12) United States Patent
Martinez et al.

(10) Patent No.: US 12,316,124 B2
(45) Date of Patent: *May 27, 2025

(54) AUTOMATIC DETECTION OF DISTRIBUTED ENERGY RESOURCES SYSTEM PARAMETERS

(71) Applicant: Heila Technologies, Inc., Somerville, MA (US)

(72) Inventors: Jorge Elizondo Martinez, Sonoma, CA (US); Albert Tak Chun Chan, Castro Valley, CA (US); Francisco A. Morocz Bazzani, Somerville, MA (US)

(73) Assignee: Heila Technologies, Inc., Somerville, MA (US)

( * ) Notice: Subject to any disclaimer, the term of this patent is extended or adjusted under 35 U.S.C. 154(b) by 386 days.

This patent is subject to a terminal disclaimer.

(21) Appl. No.: 17/884,183

(22) Filed: Aug. 9, 2022

(65) Prior Publication Data
US 2022/0385075 A1    Dec. 1, 2022

Related U.S. Application Data

(63) Continuation of application No. 17/131,227, filed on Dec. 22, 2020, now Pat. No. 11,451,088, which is a
(Continued)

(51) Int. Cl.
*H02J 3/38*     (2006.01)
*G05B 13/02*    (2006.01)
(Continued)

(52) U.S. Cl.
CPC ............ *H02J 3/381* (2013.01); *G05B 13/022* (2013.01); *G05B 15/02* (2013.01); *H02J 13/00* (2013.01);
(Continued)

(58) Field of Classification Search
CPC ...... H02J 3/381; H02J 13/00; H02J 13/00009; H02J 2203/20; H02J 2300/10;
(Continued)

(56) References Cited

U.S. PATENT DOCUMENTS 6,326,796 B1 * 12/2001 Koda ................. G01R 19/2513
                                                        324/76.12
9,316,701 B1 *  4/2016 Salmani ................. G01R 27/16
(Continued)

FOREIGN PATENT DOCUMENTS

CN          102914733 A     2/2013
CN          106537715 A     3/2017

OTHER PUBLICATIONS

International Search Report—Application No. PCT/US2018/045275, prepared by Blaine R. Copenheaver, Authorized officer, dated Oct. 19, 2018, 19 pages, together with the Written Opinion of the International Searching Authority.
(Continued)

*Primary Examiner* — Chad G Erdman
(74) *Attorney, Agent, or Firm* — The Belles Group, P.C.

(57) ABSTRACT

A method determines the topology of a DERs system having a plurality of assets, where at least one of the assets is a controllable asset. The method injects a power signal at a given frequency from a controllable asset into the DERs system. The voltage at each of the plurality of assets is measured, and the magnitude of perturbation of the voltage at the given frequency is determined for each of the plurality of assets. The method then constructs the topology of the DERs system as a function of the differences of the magnitude of perturbations of each of the plurality of assets.

18 Claims, 32 Drawing Sheets

Related U.S. Application Data continuation of application No. 16/054,967, filed on Aug. 3, 2018, now Pat. No. 10,892,638.

(60) Provisional application No. 62/540,982, filed on Aug. 3, 2017.

(51) Int. Cl.
  *G05B 15/02* (2006.01)
  *G06Q 50/06* (2024.01)
  *H02J 13/00* (2006.01)

(52) U.S. Cl.
  CPC .. *H02J 13/00009* (2020.01); *H02J 13/00028* (2020.01); *G06Q 50/06* (2013.01); *H02J 2203/20* (2020.01)

(58) Field of Classification Search
  CPC ...... G05B 13/022; G05B 15/02; G06Q 50/06; Y04S 10/12
  See application file for complete search history.

(56) References Cited

U.S. PATENT DOCUMENTS

| | | |
|---|---|---|
| 9,417,276 B1 | 8/2016 | Tatcho et al. |
| 9,500,717 B1 | 11/2016 | Salmani et al. |
| 10,892,638 B2 | 1/2021 | Martinez et al. |
| 11,451,088 B2 | 9/2022 | Martinez et al. |
| 2005/0111560 A1 | 5/2005 | Haines |
| 2007/0124026 A1 | 5/2007 | Troxell et al. |
| 2010/0207456 A1 | 8/2010 | Lasseter et al. |
| 2011/0035073 A1 | 2/2011 | Ozog |
| 2011/0093127 A1 | 4/2011 | Kaplan |
| 2012/0026908 A1 | 2/2012 | Tzannes |
| 2012/0239215 A1 | 9/2012 | Timbus et al. |
| 2012/0271470 A1 | 10/2012 | Flynn et al. |
| 2014/0306533 A1 | 10/2014 | Paquin et al. |
| 2015/0134130 A1 | 5/2015 | Carralero et al. |
| 2016/0180474 A1 | 6/2016 | Steven et al. |
| 2016/0190805 A1 | 6/2016 | Steven et al. |
| 2016/0197476 A1 | 7/2016 | Stewart |
| 2016/0363948 A1 | 12/2016 | Steven et al. |
| 2017/0103468 A1 | 4/2017 | Orsini et al. |
| 2018/0115160 A1 | 4/2018 | Tuladhar et al. |
| 2018/0262010 A1 | 9/2018 | Kato et al. |
| 2019/0044333 A1 | 2/2019 | Martinez et al. |

OTHER PUBLICATIONS

International Searching Authority—International Search Report and Written Opinion for International Patent Application PCT/US2018/064332, dated Feb. 19, 2020, 15 pages.

Ruggeri—"Centralised and decentralised control of active distribution systems: models, algorithms and applications", 2014 [retrieved on Jan. 29, 2020]. Retrieved from the internet, 86 pages https://pdfs.semanticscholar.org/d898/fec6fae3729b603b74c0d24576bd53ebc784.pdf?, entire document, 150 pages.

Wang et al. "Frequency-adaptive grid-virtual-flux synchronization by multiple second-order generalized integrators under distorted grid conditions", Turkish Journal of Electrical Engineering and Computer Sciences, Jul. 9, 2015, vol. Issue 6, pp. 1930-1945, [retrieved on Jan. 29, 2020]. Retrieved from the internet, http://journals.tubitak.gov.tr/elektrik/issues/elk-15-23-6/elk-23-6-29-1404-265.pdf , entire document.

\* cited by examiner

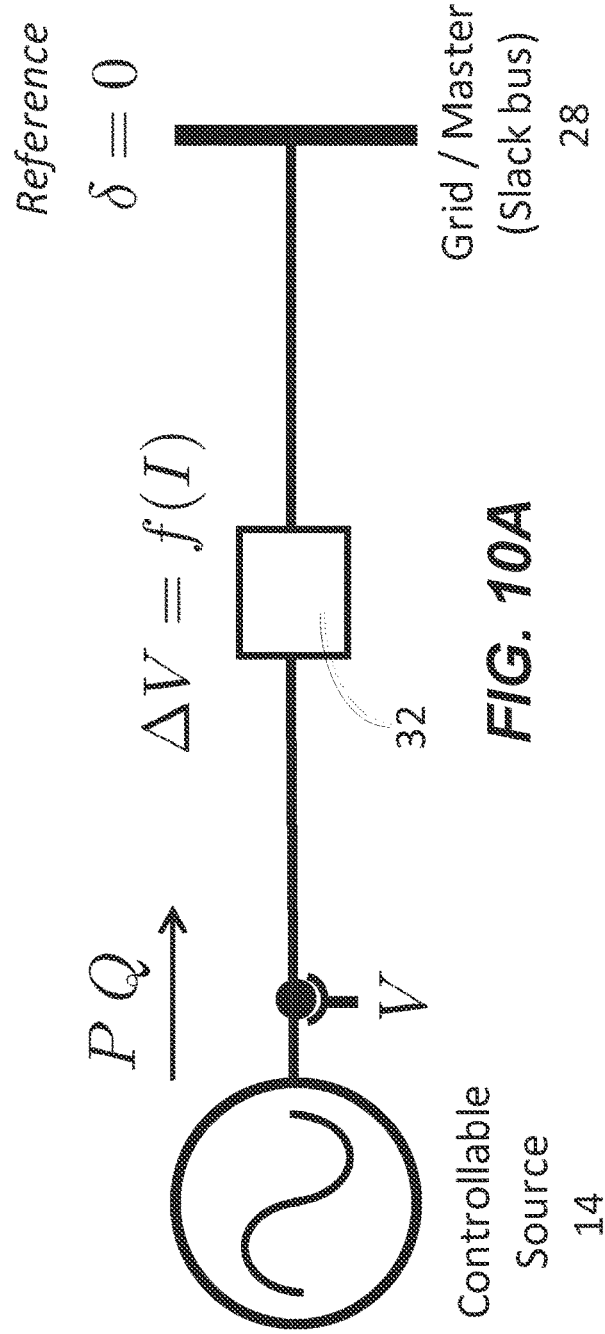
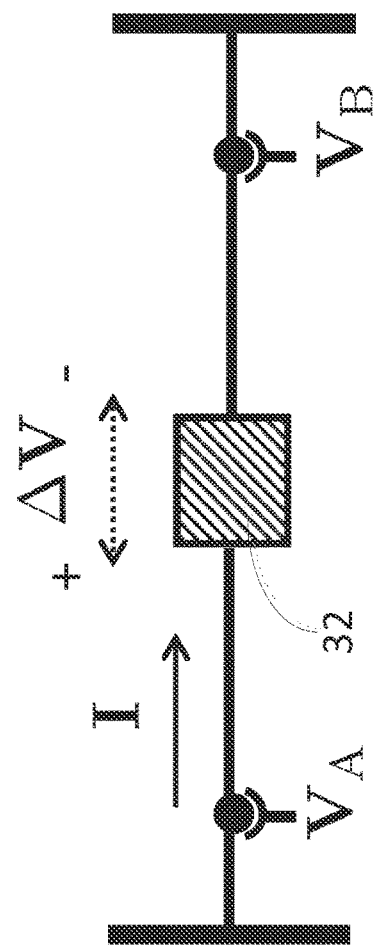
FIG. 10A
FIG. 10B

Large Signal Injection 1

Control:
$P_1^{(1)} = 10$ kW
$Q_1^{(1)} = 15$ kVAr  ⎱ 30A
$P_2^{(1)} = -20$ kW
$Q_2^{(1)} = 0$ kVAr  ⎱ 30B Measure:
$|V_A|^{(1)} = 481.62$ V
$|V_B|^{(1)} = 475.75$ V
$|V_C|^{(1)} = 479.96$ V
$\delta_C^{(1)} = -0.32$ deg Branch 1 triplet: $S_1^{(1)} = \{|V_A|^{(1)}, V_C^{(1)}, P_1^{(1)}\}$
Branch 2 triplet: $S_2^{(1)} = \{|V_B|^{(1)}, V_C^{(1)}, P_2^{(1)}\}$
Branch 3 duplet: $S_3^{(1)} = \{V_C^{(1)}, \mathbf{i}_3^{(1)}\}$

Equations

Branch 1  80

$V_{Ad}^{(1)} - V_{Cd}^{(1)} = R_1 \cdot I_{1d}^{(1)} - X_1 \cdot I_{1q}^{(1)}$
$V_{Aq}^{(1)} - V_{Cq}^{(1)} = R_1 \cdot I_{1q}^{(1)} + X_1 \cdot I_{1d}^{(1)}$ 86 —
$P_1^{(1)} = \frac{3}{2}\left(V_{Ad}^{(1)} I_{1d}^{(1)} + V_{Aq}^{(1)} I_{1q}^{(1)}\right)$
$Q_1^{(1)} = \frac{3}{2}\left(V_{Aq}^{(1)} I_{1d}^{(1)} - V_{Ad}^{(1)} I_{1q}^{(1)}\right)$ 88 — $|V_A|^{(1)^2} = \left(V_{Ad}^{(1)}\right)^2 + \left(V_{Aq}^{(1)}\right)^2$ Branch 2  82

$V_{Bd}^{(1)} - V_{Cd}^{(1)} = R_2 \cdot I_{2d}^{(1)} - X_2 \cdot I_{2q}^{(1)}$
$V_{Bq}^{(1)} - V_{Cq}^{(1)} = R_2 \cdot I_{2q}^{(1)} + X_2 \cdot I_{2d}^{(1)}$ 86 —
$P_2^{(1)} = \frac{3}{2}\left(V_{Bd}^{(1)} I_{2d}^{(1)} + V_{Bq}^{(1)} I_{2q}^{(1)}\right)$
$Q_2^{(1)} = \frac{3}{2}\left(V_{Bq}^{(1)} I_{2d}^{(1)} - V_{Bd}^{(1)} I_{2q}^{(1)}\right)$ 88 — $|V_B|^{(1)^2} = \left(V_{Bd}^{(1)}\right)^2 + \left(V_{Bq}^{(1)}\right)^2$ Branch 3  84

$V_{Cd}^{(1)} - V_g^{(1)} = R_3 \cdot I_{3d}^{(1)} - X_3 \cdot I_{3q}^{(1)}$
$V_{Cq}^{(1)} = R_3 \cdot I_{3q}^{(1)} + X_3 \cdot I_{3d}^{(1)}$ 90 —
$I_{3d}^{(1)} = I_{1d}^{(1)} + I_{2d}^{(1)}$
$I_{3q}^{(1)} = I_{1q}^{(1)} + I_{2q}^{(1)}$ unknown current in midpoint node 14 Equations, 16 Unknowns — No full system of equations

*FIG. 17B*

Large Signal Injection 2

Control:
- 30C: $P^{(2)} = 50$ kW, $Q^{(2)} = -15$ kVAr
- 30D: $P^{(2)}_1 = -100$ kW, $Q^{(2)} = 0$ kVAr Measure:
- $|V_A|^{(2)} = 472.39$ V
- $|V_B|^{(2)} = 449.29$ V
- $|V_C|^{(2)} = 471.57$ V
- $\angle^{(2)} = -0.31$ deg Branch 1 triplet: $S^{(2)}_1 = \{ |(\ ),\ (\ ),\mathbf{p}^{(2)}_1 \}$
Branch 2 triplet: $S^{(2)}_2 = \{ |(\ ),\ (\ ),\mathbf{p}^{(2)}_2 \}$
Branch 3 duplet: $S^{(2)}_3 = \{\ (\ ),\ I^{(2)}_3 \}$

Additional 14 Equations

Branch 1:
$$V^{(2)}_{Ad} - V^{(2)}_{Cd} = R_1 \cdot I^{(2)}_{1d} - X_1 \cdot I^{(2)}_{1q}$$
$$V^{(2)}_{Aq} - V^{(2)}_{Cq} = R_1 \cdot I^{(2)}_{1q} + X_1 \cdot I^{(2)}_{1d}$$
86 —
$$P^{(2)}_1 = \frac{3}{2}\left(V^{(2)}_{Ad} I^{(2)}_{1d} + V^{(2)}_{Aq} I^{(2)}_{1q}\right)$$
$$Q^{(2)}_1 = \frac{3}{2}\left(V^{(2)}_{Aq} I^{(2)}_{1d} - V^{(2)}_{Ad} I^{(2)}_{1q}\right)$$
88 —
$$|V_A|^{(2)^2} = \left(V^{(2)}_{Ad}\right)^2 + \left(V^{(2)}_{Aq}\right)^2$$

Branch 2:
$$V^{(2)}_{Bd} - V^{(2)}_{Cd} = R_2 \cdot I^{(2)}_{2d} - X_2 \cdot I^{(2)}_{2q}$$
$$V^{(2)}_{Bq} - V^{(2)}_{Cq} = R_2 \cdot I^{(2)}_{2q} + X_2 \cdot I^{(2)}_{2d}$$
86 —
$$P^{(2)}_2 = \frac{3}{2}\left(V^{(2)}_{Bd} I^{(2)}_{2d} + V^{(2)}_{Bq} I^{(2)}_{2q}\right)$$
$$Q^{(2)}_2 = \frac{3}{2}\left(V^{(2)}_{Bq} I^{(2)}_{2d} - V^{(2)}_{Bd} I^{(2)}_{2q}\right)$$
88 —
$$|V_B|^{(2)^2} = \left(V^{(2)}_{Bd}\right)^2 + \left(V^{(2)}_{Bq}\right)^2$$

Branch 3:
$$V^{(2)}_{Cd} - V^{(2)}_g = R_3 \cdot I^{(2)}_{3d} - X_3 \cdot I^{(2)}_{3q}$$
$$V^{(2)}_{Cq} - V^{(2)}_g = R_3 \cdot I^{(2)}_{3q} + X_3 \cdot I^{(2)}_{3d}$$
90 —
$$I^{(2)}_{3d} = I^{(2)}_{1d} + I^{(2)}_{2d}$$
$$I^{(2)}_{3q} = I^{(2)}_{1q} + I^{(2)}_{2q}$$

28 Equations, 27 Unknowns — Full System of Equations

$$(1)\ \hat{V}_A^{(1)} - \hat{V}_C^{(1)} = R_1 \hat{I}_1^{(1)}$$

$$(2)\ \hat{V}_B^{(1)} - \hat{V}_C^{(1)} = 0$$

$$(3)\ \hat{V}_C^{(1)} = \left(a_1 + 2 \cdot a_2 \cdot I_3^{(1)}\right) \hat{I}_3^{(1)}$$

$$(4)\ \hat{V}_A^{(2)} - \hat{V}_C^{(2)} = 0$$

$$(5)\ \hat{V}_B^{(2)} - \hat{V}_C^{(2)} = R_2 \hat{I}_2^{(2)}$$

$$(6)\ \hat{V}_C^{(2)} = \left(a_1 + 2 \cdot a_2 \cdot I_3^{(2)}\right) \hat{I}_3^{(2)}$$

FIG. 29A

$$(1)\ \hat{V}_A^{(1)} - \hat{V}_C^{(1)} = R_1 \hat{I}_1^{(1)}$$

$$(2)\ \hat{V}_B^{(1)} - \hat{V}_C^{(1)} = 0$$

$$(3)\ \hat{V}_C^{(1)} = \left(a_1 + 2 \cdot a_2 \cdot I_3^{(1)}\right) \hat{I}_3^{(1)}$$

$$(4)\ \hat{V}_A^{(2)} - \hat{V}_C^{(2)} = 0$$

$$(5)\ \hat{V}_B^{(2)} - \hat{V}_C^{(2)} = R_2 \hat{I}_2^{(2)}$$

$$(6)\ \hat{V}_C^{(2)} = \left(a_1 + 2 \cdot a_2 \cdot I_3^{(2)}\right) \hat{I}_3^{(2)}$$

$$(7)\ \hat{V}_A^{(3)} - \hat{V}_C^{(3)} = R_1 \hat{I}_1^{(3)}$$

$$(8)\ \hat{V}_B^{(3)} - \hat{V}_C^{(3)} = 0$$

$$(9)\ \hat{V}_C^{(3)} = \left(a_1 + 2 \cdot a_2 \cdot I_3^{(3)}\right) \hat{I}_3^{(3)}$$

FIG. 29B

Solve for parameters $R_{32A}$ can be calculated with Equations 1 and 2: $\quad R_{32A} = \dfrac{\hat{V}_A^{(1)} - \hat{V}_B^{(1)}}{\hat{I}_1^{(1)}} = \dfrac{0.04\text{V}}{0.04\text{A}} = 0.1\Omega$ $R_{32B}$ can be calculated with Equations 4 and 5: $\quad R_{32B} = \dfrac{\hat{V}_B^{(2)} - \hat{V}_A^{(2)}}{\hat{I}_2^{(2)}} = \dfrac{0.15\text{V}}{0.03\text{A}} = 0.5\Omega$ A1 and a2 can be solved with Equations 3 and 9:

$a_1 + 2 \cdot a_2 I_3^{(1)} = \dfrac{\hat{V}_B^{(1)}}{\hat{I}_1^{(1)}} \Rightarrow a_1 + 7 \cdot a_2 = \dfrac{-0.0096\text{V}}{0.04\text{A}} = -0.24\Omega$ $a_1 + 2 \cdot a_2 \cdot I_3^{(3)} = \dfrac{\hat{V}_B^{(3)}}{\hat{I}_1^{(3)}} \Rightarrow a_1 + 4 \cdot a_2 = \dfrac{-0.0054\text{V}}{0.03\text{A}} = -0.18\Omega$ $\left. \begin{matrix} \\ \\ \end{matrix} \right\} \begin{bmatrix} a_1 \\ a_2 \end{bmatrix} = \begin{bmatrix} 1 & 7 \\ 1 & 4 \end{bmatrix}^{-1} \begin{bmatrix} -0.24 \\ -0.18 \end{bmatrix}$ $a_1 = -0.1$
$a_1 = -0.02$

*FIG. 30*

AUTOMATIC DETECTION OF DISTRIBUTED ENERGY RESOURCES SYSTEM PARAMETERS

PRIORITY

This patent application is a continuation of U.S. patent application Ser. No. 17/131,227, filed Dec. 22, 2020, which is a continuation of U.S. patent application Ser. No. 16/054,967, filed Aug. 3, 2018, now U.S. Pat. No. 10,892,638, which claims priority from provisional U.S. patent application No. 62/540,982, filed Aug. 3, 2017, entitled, "AUTOMATIC DETECTION OF POWER NETWORK PARAMETERS," and naming Jorge Elizondo Martinez, Albert Tak Chun Chan, and Francisco Andres Morocz Bazzani as inventors, the disclosures of which are incorporated herein, in their entireties, by reference.

FIELD OF THE INVENTION

Illustrative embodiments of the invention generally relate to power distribution networks and, more particularly, illustrative embodiments of the invention relate to identifying the topology of assets in a distributed energy resources system.

BACKGROUND OF THE INVENTION

The electric grid connects homes, buildings, and a wide variety of devices/systems to centralized power sources. This interconnectedness typically involves centralized control and planning, which, undesirably, can cause grid vulnerabilities to rapidly cascade across the network. To mitigate these risks, those in the art have formed "aggregated distributed energy resources systems" (referred to herein for simplicity as "DERs systems"). By way of example, a "microgrid" is one such implementation of a DERs system. Specifically, among other qualities, microgrids often include controlled clusters of electric generation devices and loads that provide a coordinated response to a utility need. A microgrid also can operate in a state in which it is connected to the main grid or disconnected from the main grid. These features, among other things, improve DER efficiency, resiliency, and reliability.

The US Department of Energy formally defines a microgrid as a group of interconnected loads and distributed energy resources ("DERs") with clearly defined electrical boundaries. When used together, this group acts as a single controllable entity with respect to the main grid. To those ends, a microgrid often has distributed electric generators (e.g., diesel generators and gas turbines, etc.), batteries for power storage, and renewable power resources, such as solar panels, hydroelectric structure, and wind turbines.

SUMMARY OF VARIOUS EMBODIMENTS

In accordance with one embodiment of the invention, a method determines the topology of a DERs system having a plurality of assets, where at least one of the assets is a controllable asset. The method injects a power signal at a given frequency from a controllable asset into the DERs system. The voltage at each of the plurality of assets is measured after the signal is injected, and the magnitude of perturbation of the voltage at the given frequency is determined for each of the plurality of assets. The method then constructs the topology of the DERs system as a function of the differences of the magnitude of perturbations of each of the plurality of assets.

Furthermore, some embodiments inject a second power signal, at a second given frequency, from a second controllable asset into the DERs system. The voltage at each of the plurality of assets is measured, and the magnitude of perturbation of the voltage at the second given frequency is determined for each of the plurality of assets. The topology of the DERs system is refined as a function of the differences of the magnitude of perturbations of each of the plurality of assets. Illustrative embodiments inject power signals with a different controllable asset until the topology of all of the assets in the DERs system is determined.

The power signal may be a small signal or a large signal. The small signal may be injected while the DERs system is operating, and is less than 10% of the steady state output power of the given controllable asset at that particular time. In some embodiments, the power signal has a frequency of less than about 1 kHz. More particularly, in some embodiments, the power signal has a frequency of less than 100 Hz. In embodiments with a plurality of power signals (e.g., the power signal and the second power signal), the power signals may be sent simultaneously and have different frequencies. Alternatively, the power signals may be sent in series.

The DERs system may be connected to the grid and/or removably connected to the grid (e.g., a microgrid). Furthermore, the DERs system includes assets such as a distributed energy resource and/or a load, either of which may monitor voltage. Furthermore, the DERs system may include dedicated voltage monitors, for example, at nodes. In some embodiments, the method performs a Fourier transform on the measured voltage to determine the magnitude of the perturbation of the voltage at the given frequency. A larger perturbation in a first asset indicates that the first asset is closer to the controllable asset than a second asset having a smaller perturbation. In some embodiments, the method determines a physical characteristic of a network element in the DERs system as a function of the power signal and the measured voltage change.

In accordance with another embodiment, an asset manager is configured to control distribution of power within a DERs system that has a plurality of assets. The asset manager is configured to operate with a given asset in the DERs system. At least one other asset is configured to inject a power signal at a given frequency into the DERs system. The asset manager includes an interface that is configured to receive asset information relating to the given asset. Furthermore, the interface is configured to communicate with at least one a) other asset manager, b) central controller, and/or c) voltage monitor in the DERs system. The asset manager also includes a voltmeter configured to measure voltage from the injected power signal at the given frequency. A topology engine is operatively coupled with the interface, and configured to determine a perturbation of voltage at the given frequency caused by the injected power signal. The topology engine is configured to construct the topology of the DERs system as a function of the differences of the magnitude of perturbations of each of the plurality of assets. Alternatively, or additionally, the topology engine is configured to send information relating to the perturbation of voltage at the given frequency to a centralized controller where the topology of the DERs system is constructed as a function of the differences of the magnitude of perturbations of each of the plurality of assets.

In accordance with yet another embodiment, a method determines a physical characteristic of a network element in a DERs system that has a plurality of assets. The plurality of assets are electrically connected by a plurality of network elements, such as transmission lines. The method injects a power signal at a given frequency into a given network element between two assets in the DERs system. The change in voltage across the given network element between the two assets is physically measured to produce a measured voltage change. The method determines the physical characteristic of the network element as a function of the power signal and the measured voltage change.

In some embodiments, the method injects a second power signal, at a second given frequency, into a second given network element between two assets in the DERs system. The change in voltage across the second given network element is measured to produce a second measured voltage change. The physical characteristic of the second given network element is determined as a function of the power signal and the measured voltage change. In some embodiments, the power signal and the second power signal are sent simultaneously and have different frequencies. Alternatively, the power signal may be sent at a regular interval.

Among other things, the network element may be a transmission line. The physical characteristic may be impedance of the network element. Additionally, or alternatively, the physical characteristic may be length and size of the transmission line. In some embodiments, the injected power signal is a large signal that is injected when the DERs system is not in operation. Additionally, or alternatively, the injected power signal is a small signal that is injected when the DERs system is in operation. The small signal may be less than 10% of the steady state output power of the given controllable asset at that particular time. Additionally, the power signal(s) may have a frequency of less than 1 kHz. More specifically, the power signal(s) may have a frequency of less than 500 Hz. Preferably, the power signal(s) may have a frequency of less than 50 Hz. In illustrative embodiments the power signal(s) may have a frequency of greater than about 0.1 Hz.

Although illustrative embodiments discuss power signals, it should be understood that some embodiments may directly control current signals. Accordingly, the discussion relating to power signals should also be deemed to apply to current signals and vice-versa, unless the context otherwise requires.

In accordance with another embodiment, an asset manager is configured to control distribution of power within a DERs system having a plurality of assets. The asset manager is configured to operate with a given asset in the DERs system. The asset manager includes an interface configured to receive asset information relating to the given asset and to communicate with at least one a) other asset manager, b) central controller, and/or c) voltage monitor in the DERs system across a given network element. Furthermore, at least one other asset is configured to inject a power signal at a given frequency into the given network element. The asset manager also includes a voltmeter configured to measure the change in voltage across the given network element at the given frequency. A physical characteristic analysis engine is configured to determine the physical characteristic of the network element as a function of the power signal and the measured voltage.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 10A schematically shows a diagram of the controllable source connected to the master grid via a power network element.

FIG. 10B schematically shows a diagram of two generic nodes being connected together via a power network element in accordance with illustrative embodiments of the invention.

FIGS. 11A-11C schematically show the test signal, the resulting terminal voltage at the controllable source, and the quadratic current to terminal voltage relationship in accordance with illustrative embodiments of the invention.

FIGS. 17B-17C schematically shows parameters controlled and measured by the asset manager.

FIGS. 29A-29B schematically show the equations derived for the network elements in FIGS. 27-28.

FIG. 30 schematically shows the physical characteristic analysis engine solving the parameters of the equations obtained for the network elements in FIGS. 27-29.

DESCRIPTION OF ILLUSTRATIVE EMBODIMENTS

Illustrative embodiments determine the topology and/or physical properties of an aggregated distributed energy resources system ("DERs system" as noted above), such as a microgrid, a group of microgrids, and/or a larger grid. It is common for a variety of assets in the DERs system to be interconnected using existing infrastructure, such as legacy cables, transformers, switches, etc. Accordingly, it would be beneficial to know the topology of the network (i.e., how the assets are connected) and the physical properties of the DERs system (e.g., measure properties whose value describes a state of a physical system, such as the impedance of legacy cables). To that end, an asset in the grid injects a power signal into the network, and the effect of that signal at the other assets is measured and used to determine the topology and/or physical properties of the DERs system. Details of illustrative embodiments are discussed below.

Figure 1:
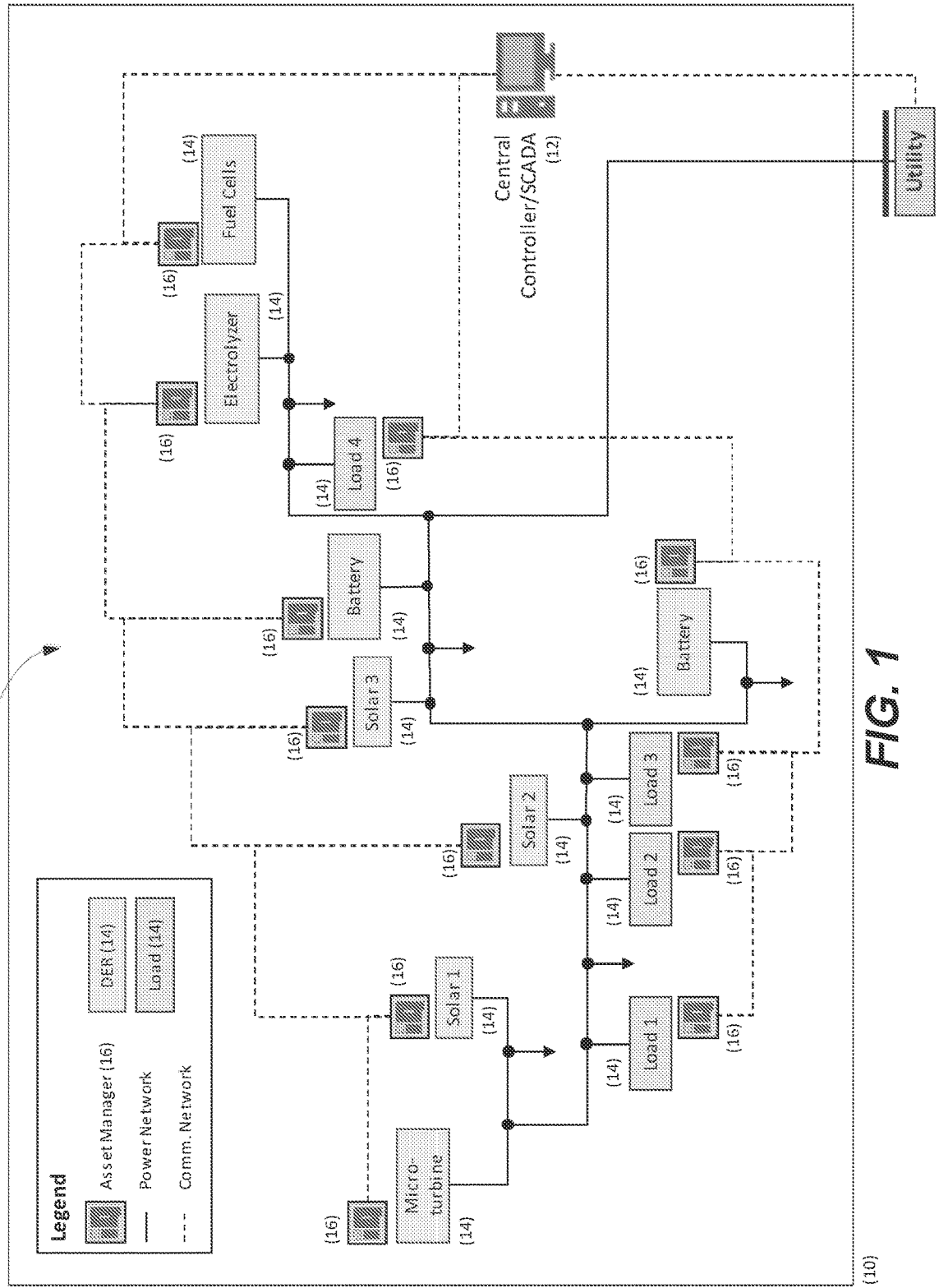
FIG. 1 schematically shows a power grid that may be implemented in accordance with illustrative embodiments of the invention.

FIG. 1 schematically shows an exemplary DERs system 10 implemented in accordance with illustrative embodiments of the invention. Among other ways, the DERs system 10 may be implemented as a microgrid that connects with a larger grid ("Utility" in FIG. 1) through a central controller 12/SCADA device 12; i.e., a supervisory control and data acquisition device. For simplicity, this description discusses various microgrid embodiments, although those skilled in the art should understand that various embodiments apply to other grid structures beyond microgrids. Accordingly, discussion of a microgrid is by example only and thus, not intended to limit various DERs system 10 embodiments.

Generically, the microgrid of FIG. 1 is a grid entity capable of generating, storing, and/or distributing electrical energy and thus, also is identified by reference number 10. The microgrid 10 of FIG. 1 may supply energy for a specific purpose, such as to a prescribed business (e.g., a power-hungry data center), a neighborhood, or for distribution to remote consumers via a larger power grid.

FIG. 1 schematically shows an exemplary DERs system implemented in accordance with illustrative embodiments of the invention. The DERs system includes an electrical power network that interconnects the loads and DERs, including cables, transformers, switches, etc. Furthermore, the DERs system may include a grid connection. Among other ways, this DERs system may be implemented as a microgrid 10 that connects with a larger grid ("Utility" in FIG. 1) through a central controller/SCADA device 12; i.e., a supervisory control and data acquisition device. For simplicity, this description discusses various microgrid embodiments, although those skilled in the art should understand that various embodiments apply to other grid structures beyond microgrids. Accordingly, discussion of a microgrid is by example only and thus, not intended to limit various DERs system embodiments.

Generically, the microgrid 10 of FIG. 1 is a power grid entity that is capable of generating, storing, and/or distributing electrical energy and thus, also is identified by reference number 10. The microgrid 10 of FIG. 1 may supply energy for a specific purpose, such as to a prescribed business (e.g., a power-hungry data center), a neighborhood, or for distribution to remote consumers via the larger grid.

As known by those in the art and defined by the US Department of Energy, a microgrid may be a group of interconnected loads and distributed energy resources within clearly defined electrical boundaries that acts as a single controllable entity with respect to the larger grid. In a microgrid implementation of a DERs system, a microgrid can connect and disconnect from the larger grid to enable it to operate in both grid-connected or island-mode.

Accordingly, the microgrid 10 of FIG. 1 has a plurality of assets 14 connected by conventional interconnect techniques, such as with cables and other peripheral equipment (e.g., transformers). As also known by those in the art, an asset 14 can be a load or a distributed energy resource. Specifically, a device that transforms electricity into different types of energy may be considered a load. Exemplary loads often found in microgrids may include motors, pumps, HVACs, and illumination systems. Conversely, storage (e.g., batteries, flywheels, etc.) and generation devices (e.g., solar panels, wind turbines, diesel generators, gas turbine generators, etc.) may be considered distributed energy resources. FIG. 1 schematically shows several of these different types of assets 14.

As noted above, however, the DERs system of FIG. 1 may be configured to have many of the functions of a microgrid, but not meet the precise definition of the US Department of Energy. For example, the DERs system of FIG. 1 may operate in a manner that does not necessarily operate as an island, while also having many corresponding functions to those of a microgrid. For example, the DERs system may include a feeder in a distribution network that has dozens or hundreds of assets 14.

Frequently, these assets 14 are interconnected (e.g., in the microgrid 10) using existing infrastructure. This infrastructure may include legacy cables, transformers, switches, power electronic interfaces, and other network equipment used to distribute power between the sources, storage devices, and loads. Accordingly, information about the physical network and its electrical properties may be largely unknown.

Illustrative embodiments relate to techniques for determining properties of the DERs system. Specifically, one or both of the DERs system topology and the network parameters are determined. As known by those in the art, network parameters are components of the network that define a relationship between the power flow and the voltage. Examples of network parameters determined in various embodiments include, without limitation, line impedances, transformers and their performance properties, transfer switches resistances, etc. Incomplete knowledge of network topology and parameters is problematic for several reasons.

As an initial matter, network parameters provide limits for safe operations of the DERS system 10 (e.g., microgrid 10). For example, it often is important to know the maximum power flow allowed before protections in one of the network branches trips on overcurrent. Similarly, it often is important to understand power flow constraints so that the microgrid 10 can avoid unacceptable low voltages at particular nodes. Furthermore, network parameters such as line resistances allow the power grid 10 user to take into account losses of the network. Without knowledge of these line losses, the dispatch logic of a collection of controllable assets results in suboptimal performance. Additionally, network parameters affect the dynamics of the system assets 14 caused by changing power commands or external eventualities. For example, a sudden disconnection from the grid, in general, creates a reaction with a longer time constant in an inverter located far from the interconnection point than to one located close to it. Therefore, knowledge of these parameters is important in the selection of control coefficients for both internal control loops to the devices, and external control loops (such as droop control equations).

In prior art systems known to the inventors, the arrangement of the assets 14 within the power grid 10 is captured using a single line diagram. However, information such as line impedances and transformer performance curves are not reported. Additionally, single line diagrams are infrequently updated, incomplete, error-prone, or completely unavailable.

Some professionals perform high-level calculations of the parameters estimating distances between the assets 14 using either the single line diagram when available or directly tracking the electrical connections in the field. However, these methods tend to provide inaccurate results and fail to account for all the variables that may impact the parameters over time. For example, calculating the impedance of a line solely on the basis of wire size and the distance between two nodes fails to account for the dynamic (but large) effects of loading, temperature, and system details (overhang vs. underground, connectors, etc.).

In accordance with illustrative embodiments, each asset 14 in the DERs system 10 of FIG. 1 may have a dedicated asset manager 16 to manage and control at least portions of its operation within the network. Assets 14 having asset managers 16 thus may be referred to as "controllable assets 14." As such, the asset managers 16 effectively may be considered to form a distributed intelligent network that can be controlled and used by the central controller 12.

The asset managers 16 of FIG. 1 are co-located with and connected to assets 14, and can perform one or more of the following functions:

1) control the asset's 14 output, such as its real and reactive power output, and/or output voltage and frequency;

2) measure qualities of the asset 14 and the system 10 (e.g., at the point where the asset 14 connects with the system 10); such as the asset's 14 terminal voltage and frequency, operating parameters, as other variables related to the asset 14 itself and/or the environment; and 3) communicate with other assets 14 or devices through a variety of known methods.

In preferred embodiments, the asset managers 16 enable a plug-and-play solution for simple, modular deployment. As such, the asset managers 16 may automatically reconfigure operation as assets 14 are added, removed, or modified from the microgrid 10. Moreover, the asset managers 16 also may have self-learning intelligence using machine learning and artificial intelligence technology, enabling the microgrid 10 to attain and preferably maintain optimal, close to optimal, or otherwise enhanced performance. When implemented with an open framework, third party software developers can add specially tailored software to the asset manager functionality to customize operation for specific customer needs.

It should be noted that although FIG. 1 shows all assets 14 as having an asset manager 16, some embodiments deploy the asset managers 16 for fewer than all assets 14. Other embodiments deploy single asset managers 16 or groups of asset managers 16 to be shared among two of more sets of assets 14. Accordingly, discussion of each asset 14 having a dedicated asset manager 16 is for convenience and not intended to limit various embodiments. Furthermore, some asset managers 16 may be physically located in close proximity to its asset(s) 14 (e.g., physically adjacent to the asset 14). Other embodiments, however, may couple an asset manager 16 remotely from its asset 14. For example, some embodiments may use a cloud model and implement the asset manager 16 on a device remote from the asset 14 it manages. The asset 14 therefore may be located in Massachusetts, while the asset manager 16 may be deployed in California or China.

Those skilled in the art may deploy the asset manager 16 in a distributed manner local to the asset 14, remote from the asset 14, or both local/and remote to/from the asset 14. For example, the asset manager 16 may be implemented using a plurality of different, spaced apart modules around the asset 14 itself. As another example, the asset manager 16 may be implemented using a local set of one or more module(s) and a remote set of one or more module(s). Accordingly, the form factor and location of the asset manager 16 as being a single unit in a single housing physically adjacent to its asset 14 is for illustrative purposes only and not intended to limit various embodiments of the invention.

Figure 2:
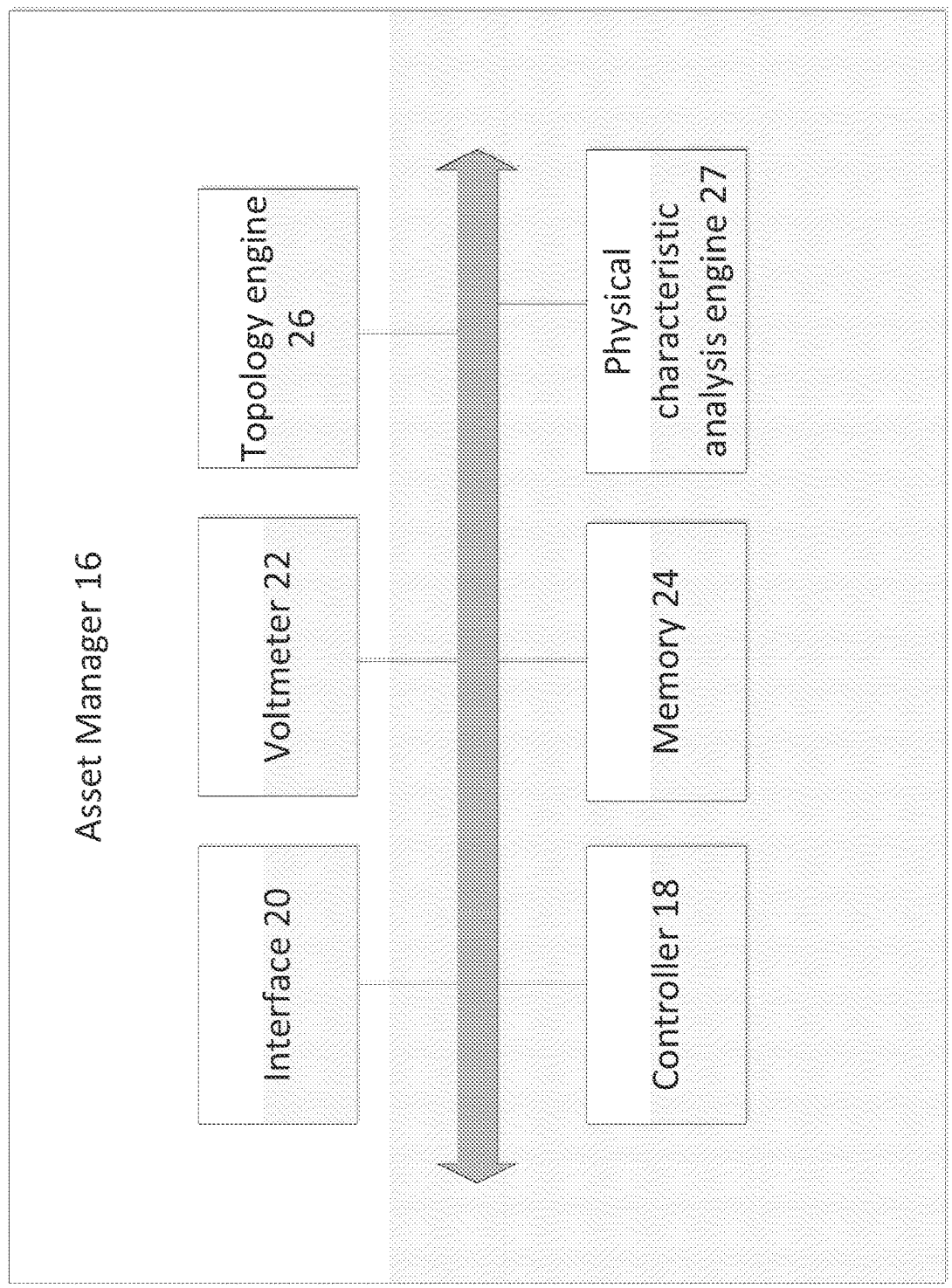
FIG. 2 schematically shows an asset manager configured in accordance with illustrative embodiments of the invention.

FIG. 2 schematically shows one of the asset managers 16 of FIG. 1 configured in accordance with illustrative embodiments of the invention. As shown, the asset manager 16 of FIG. 2 has a plurality of components that together perform some of its functions. Each of these components is operatively connected by any conventional interconnect mechanism. FIG. 2 simply shows a bus communicating each the components. Those skilled in the art should understand that this generalized representation can be modified to include other conventional direct or indirect connections. Accordingly, discussion of a bus is not intended to limit various embodiments.

Indeed, it should be noted that FIG. 2 only schematically shows each of these components. Those skilled in the art should understand that each of these components can be implemented in a variety of conventional manners, such as by using hardware, software, or a combination of hardware and software, across one or more other functional components. For example, a controller 18 (discussed below) may be implemented using a plurality of microprocessors executing firmware. As another example, the controller 18 may be implemented using one or more application specific integrated circuits (i.e., "ASICs") and related software, or a combination of ASICs, discrete electronic components (e.g., transistors), and microprocessors. Accordingly, the representation of the controller and other components in a single box of FIG. 2 is for simplicity purposes only. In fact, in some embodiments, the controller 18 of FIG. 2 is distributed across a plurality of different machines—not necessarily within the same housing or chassis.

It should be reiterated that the representation of FIG. 2 is a significantly simplified representation of an actual asset manager 16. Those skilled in the art should understand that such a device may have many other physical and functional components, such as central processing units, communication modules, protocol translators, sensors, meters, etc. Accordingly, this discussion is in no way intended to suggest that FIG. 2 represents all of the elements of an asset manager 16. Furthermore, in some embodiments, the asset manager 16 may not include some of the described components. For example, in some embodiments, the asset manager 16 may include the topology engine 26 but not the physical characteristic engine 27, and vice-versa. However, some embodiments may include both.

The asset manager 16 includes the controller 18 configured to, among other things, control the asset's 14 output, such as its real and reactive power output, and/or output voltage and frequency. Accordingly, the controller 18 can command the asset 14 to inject a power signal into the DERs system 10. The asset manager 16 also includes memory 24, an interface 20 to communicate with the asset 14 and other devices, and a voltmeter 22 configured to measure qualities of the asset 14 and the system 10 (e.g., at the point where the asset 14 connects with the system 10), such as the asset's 14 terminal voltage and frequency.

Although the interface 20 may communicate with the asset 14 using a protocol that may be proprietary to its assigned asset 14, it preferably communicates with the controller 20 and/or other asset managers 16 using a common communication protocol to the DERs system (e.g., microgrid 10). Each of these components and other components cooperate to perform the various discussed functions.

The asset manager 16 also includes a topology engine 26 that determines the topology of the DERs system 10, as will be described further below.

Determining Network Topology

Figure 3:
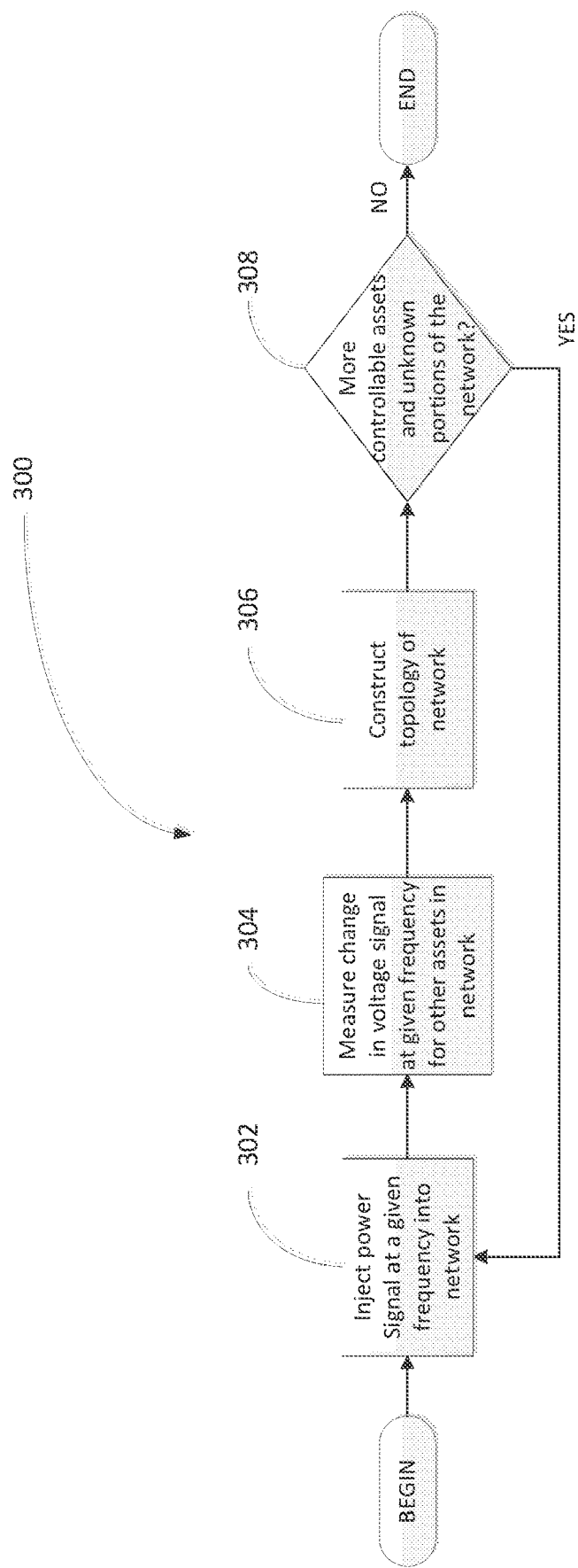
FIG. 3 shows a process of determining network topology in accordance with illustrative embodiments of the invention.
Figure 4:
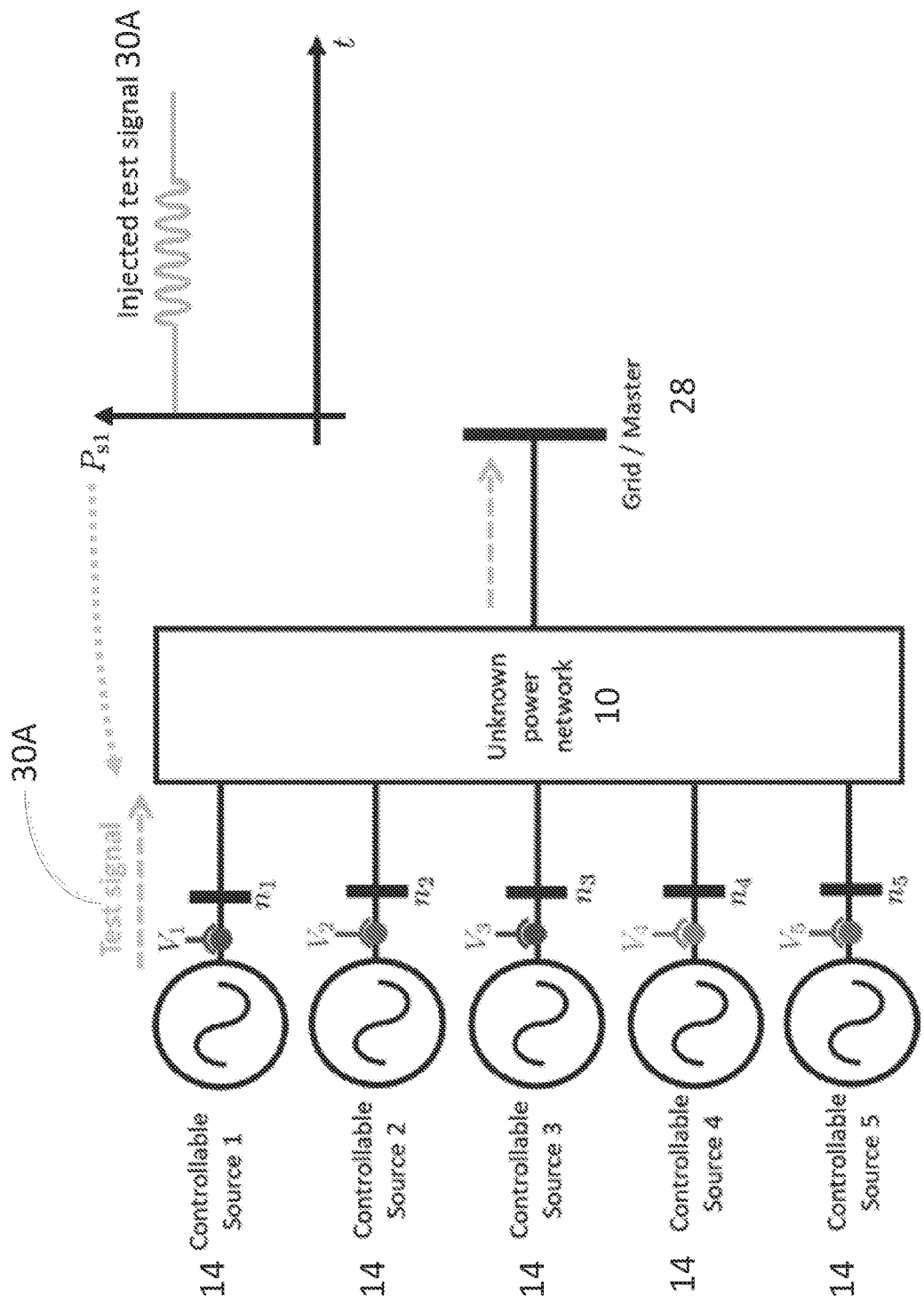
FIG. 4 schematically shows the DERs system having an unknown topology in accordance with illustrative embodiments of the invention.

FIG. 3 shows a process 300 of determining network 10 topology in accordance with illustrative embodiments of the invention. To facilitate discussion of the process described in FIG. 3, reference is made to FIGS. 4-8. FIG. 4 schematically shows the DERs system 10 having an unknown topology in accordance with illustrative embodiments of the invention. The network 10 has five controllable assets 14, which should be known because the assets are generally installed by, or at the instruction of, the user/manager of the DERs system 10. The DERs system 10 in this example is connected to a master grid 28, where voltage is fixed and known. In some embodiments, the DERs system 10 may be disconnected from the grid 28.

Without intended to limit illustrative embodiments of the invention, the DERs system 10 of FIG. 4 has five controllable sources 14 (e.g., batteries, generators, etc.). It should be understood that the DERs system 10 may have many more or fewer controllable sources 14 than that shown. Additionally, the DERs system 10 may also have many non-controllable assets 14 (e.g., non-controllable loads), which are not shown in the figures.

The process of FIG. 3 is substantially simplified from a longer process that may be used to determine network topology. Accordingly, the process can have many steps that those skilled in the art likely would use. In addition, some of the steps may be performed in a different order than that shown, or at the same time. Those skilled in the art therefore can modify the process as appropriate.

The process 300 of determining network 10 topology begins at step 302, which actively injects real and/or reactive power signals 30 into the network 10. Illustrative embodiments may alternatively, or additionally, inject current into the network 10. The relationship between current and power can be defined by an equation, which is described further below. The power signal 30 is injected by a single asset 14, such as Controllable Source 1 in FIG. 4, so that the effect of the injected signal(s) 30 can be measured at different points along the network 10 (e.g., at Controllable Source 2-5). As described previously, the controller 18 or the central controller 12 can instruct the asset 14 to provide the signal 30. Furthermore, in illustrative embodiments, the injected signals 30 (also referred to as "test signals 30") may include a large signal 30 and/or a small signal 30. Any or all of the controllable assets 14 may provide the test signal(s) 30.

An example of the test signal 30 is schematically shown in the top-right corner of FIG. 4. As can be seen, the test signal 30 has a given frequency (e.g., 2 Hz). Preferably, the frequency of the test signal 30 is unique in the DERs system 10, as opposed to other operating signals, such that the effect of the signal 30 on the voltage can be determined. Each controllable source 14 may communicate with an asset manager 16 (e.g., a dedicated asset manager 16) that includes the topology engine 26, described in FIG. 2. The topology engine 26 may determine the magnitude of perturbation, at the frequency of the signal 30, as measured by the voltmeter 22.

The controller 18 may provide the topology engine 26 with information relating to the test signal 30. The controller 18 may receive the given frequency from a central controller 12 communicating with the plurality of assets 14, or from the controller 18 of the asset manager 16 for another asset 14. Additionally, or alternatively, the controller 18 may specify the given frequency to the central controller 12 and/or to the controller 18 of another asset 14. After the given frequency is specified, the topology engine 26 may perform a Fourier transform to determine the magnitude of perturbation of the voltage at the given frequency. Although shown in the asset manager 16, in some embodiments, the topology engine 26 may be in a central controller 12 separate from the asset manager 16.

Figures 5A, 5B:
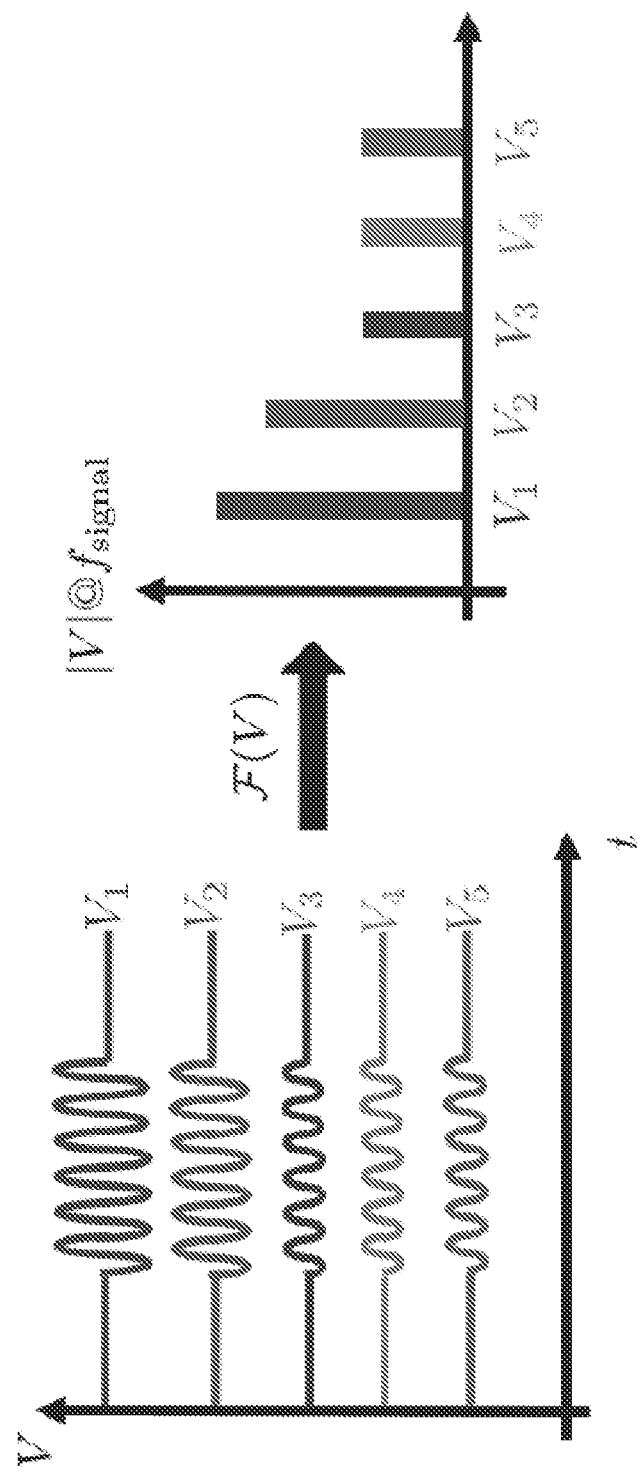
FIG. 5A schematically shows examples of the measured voltages at each of the plurality of controllable sources in accordance with illustrative embodiments of the invention.
FIG. 5B schematically shows the amplitude of the perturbation obtained by a Fourier transform of the measured voltage from each of the controllable sources in FIG. 5A.

After Controllable Asset 1 is instructed to inject the test signal 30 at a first given frequency into the network (e.g., at node 14 the test signal 30 causes a change in voltage at all of the other assets connected to the unknown DERs system 10. FIG. 5A schematically shows examples of the measured voltages (i.e., $V_1$-$V_5$) at each of the controllable sources 1-5, in accordance with illustrative embodiments of the invention. Returning to FIG. 3, after the test signal 30 is injected into the network 10, the process proceeds to step 304, where the change in voltage for a particular frequency is measured (e.g., using the voltmeter 22 of the asset manager 16) in one or more other assets 14 in the network 10.

Each of Controllable Sources 1-5 may be coupled to one of the respective voltmeters 22, which measures the terminal voltage at each controllable source 1-5. As seen in FIG. 5A, the injected test signal 30A creates voltage perturbations of various magnitudes at each of Controllable Sources 1-5. Specifically, the voltage perturbation is at the frequency of the test signal 30. The actual voltage magnitude, however, is not significant for our purposes. The overall voltage magnitude is caused by the large signal value that is affected by many conditions, such as the status of uncontrollable loads, the operating point of the sources, etc.

The process then proceeds to step 306, which constructs the topology of the network (e.g., using the topology engine 26). FIG. 5B schematically shows the amplitude of the perturbation obtained by a Fourier transform of the measured voltage from each of the controllable sources. As can be seen, Controllable Source 1 has the largest voltage perturbation at the given frequency (because it is the asset 14 injecting the signal 30A), followed by Controllable Source 2, and then Controllable Sources 3-5, which have the same voltage perturbation. From this information, it can be determined that Controllable Source 2 is closer to Controllable Source 1, and that Sources 3, 4, and 5 connect at a single point to the branch that connects Source 1 to the grid. The topology engine 26 may use this information to determine the topology of the network 10.

Figure 6:
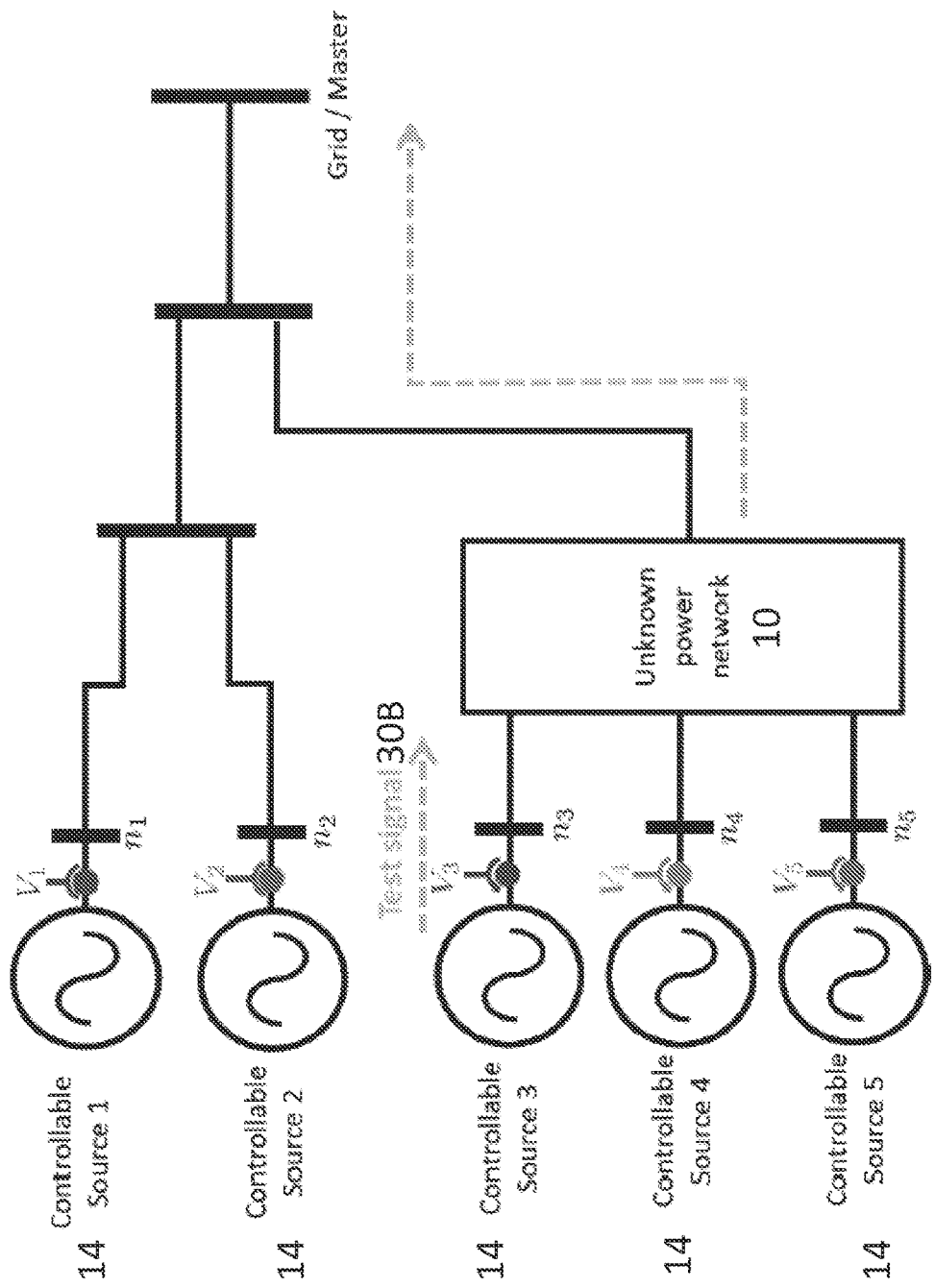
FIG. 6 schematically shows the known topology discovered as a result of the injected test signal from controllable source in FIG. 4.

FIG. 6 schematically shows the known topology discovered as a result of the injected test signal 30 from controllable source 1 in FIG. 4. The process then proceeds to step 308, which checks whether there are more controllable assets 14 and unknown portions of the DERs system 10. If there are no more controllable assets 14 or unknown portions of the DERs system 10, then the process comes to an end. However, if there are more controllable assets 14 (e.g., Controllable Sources 2-5) and unknown portions of the DERs system 10, then the process repeats itself. For example, a second test signal 30B having a second given frequency (e.g., 1 Hz) is injected into the network 10 by Controllable Source 3.

Figures 7A, 7B:
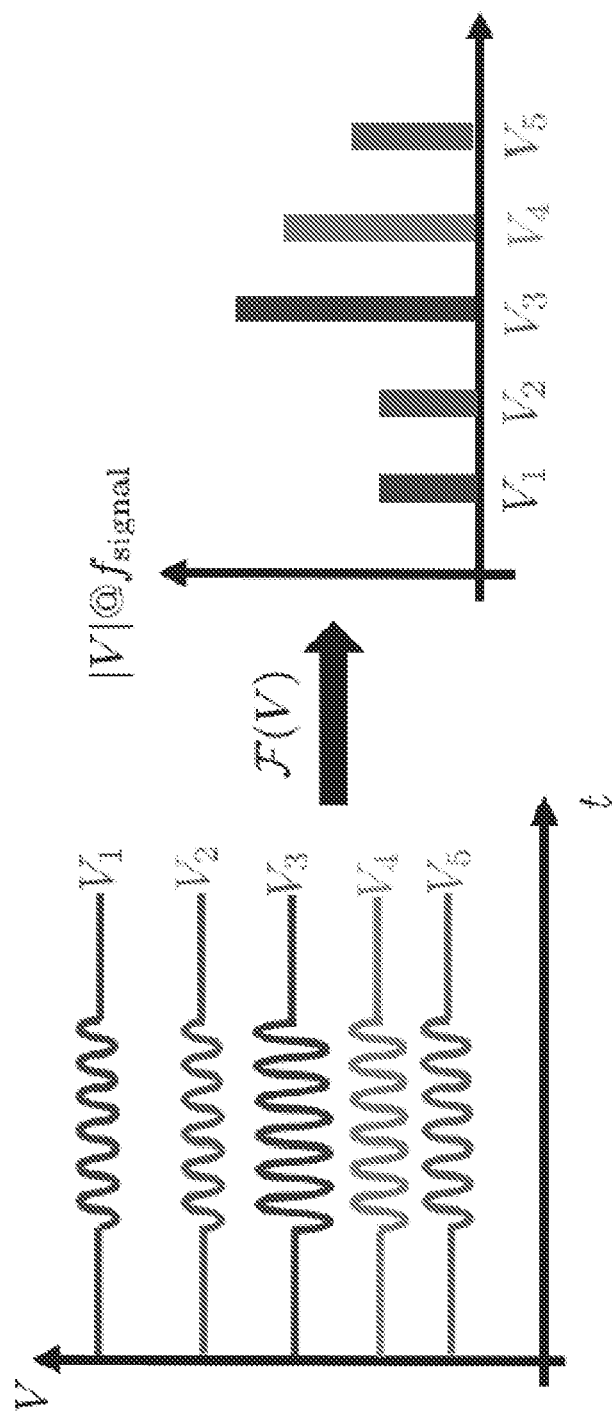
FIG. 7A schematically shows examples of the measured voltages at each of the plurality of controllable sources in accordance with illustrative embodiments of the invention.
FIG. 7B schematically shows the amplitude of the perturbation obtained by a Fourier transform of the measured voltage from each of the controllable sources in FIG. 7A.

FIG. 7A schematically shows examples of the measured voltages at each of the controllable sources 1-5, in accordance with illustrative embodiments of the invention. FIG. 7B schematically shows the amplitude of the perturbation obtained by a Fourier transform of the measured voltage, in accordance with illustrative embodiments of the invention. In this example, the larger voltage perturbation is in source 3 (since it is the one injecting the test signal 30B), followed by source 4, then 3, and sources 1 and 2 measure the same perturbation (as it should be since the already discovered part of the network is known). With this information, one skilled in the art can deduce that source 4 is closer than source 5 to source 3.

Figure 8:
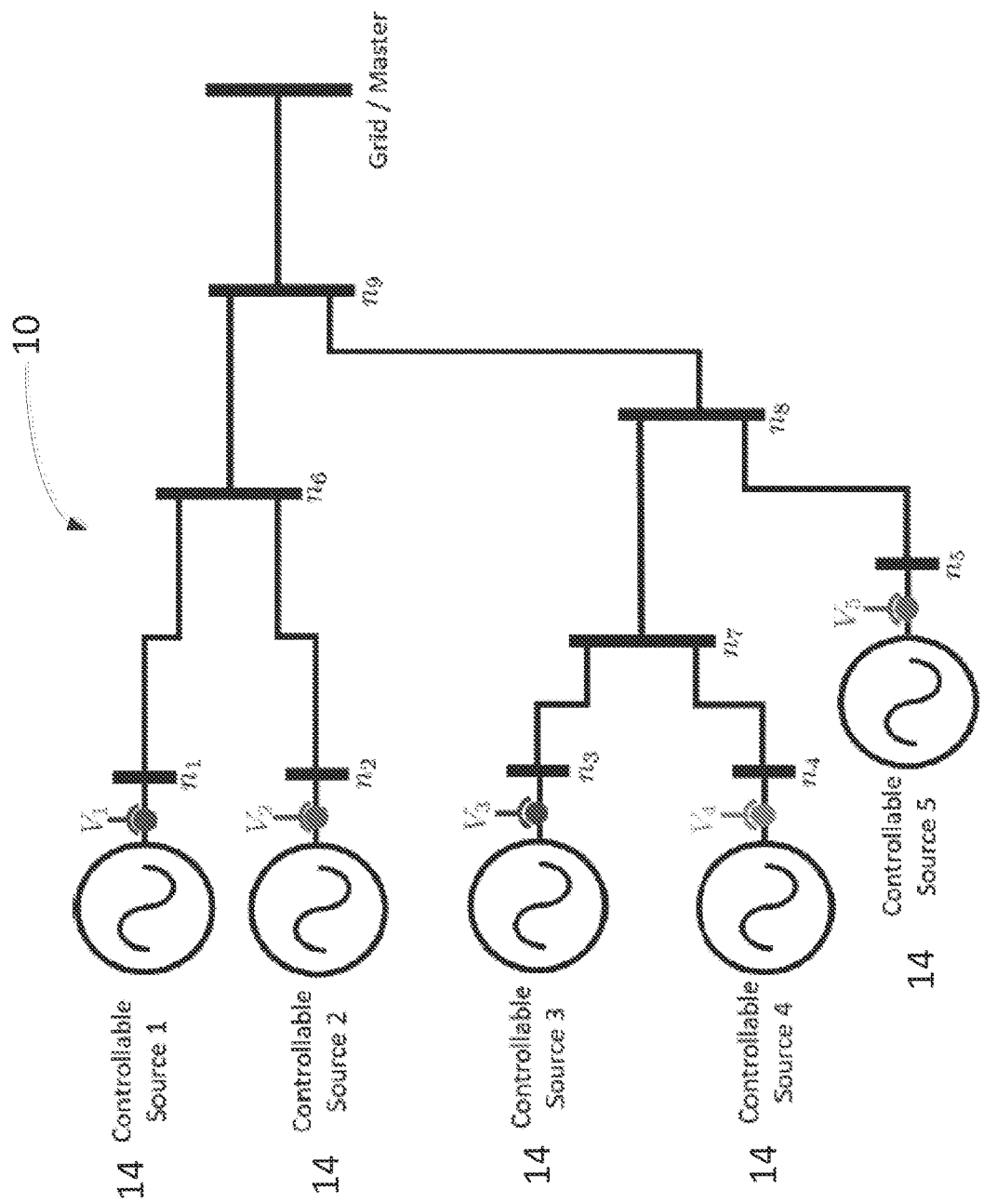
FIG. 8 schematically shows the system topology discovered in accordance with illustrative embodiments of the invention.

Accordingly, FIG. 8 schematically shows the discovered exemplary system topology, in accordance with illustrative embodiments of the invention. Although the test signal 30A and the test signal 30B were described as taking place in series, in some embodiments, both test signals may be injected simultaneously while having different frequencies that are not multiples of each other (because sinusoids of different frequencies are orthogonal). By having different frequencies, the voltage perturbation effect of each respective test signal 30A and 30B on can be isolated using two different Fourier transforms.

If controllable sources 3, 4, and 5 are elements of the system but not controllable (i.e., the second signal injection could not have been done), then the unknown portion of the network in FIG. 6 is not completely discoverable. Furthermore, although all of the sources were described as controllable sources 1-5, the topology of the unknown DERs system 10 was determined using only controllable source 1 and 3. Accordingly, controllable sources 2, 4, and 5 could be non-controllable assets (e.g., voltage monitoring points), and the entire topology of the DERs system 10 could still be determined.

It should be understood that the above described example is not intended to limit illustrative embodiments of the invention. Instead, the example discussed with reference to FIGS. 4-8 is merely intended to facilitate discussion of how illustrative embodiments work.

Furthermore, it should be understood that the presently described power signals 30 are different from standard communication signals usually sent through a dedicated medium (i.e., a network which is completely separated from the DERs system 10), such as Ethernet or Wi-Fi networks. The presently described power signals 30 are injected directly into the DERs system 10. However, some communication signals are sent through the DERs system 10 (e.g., "Power line communications" aka "PLC"). In contrast to the present power signals, which operate in the less than 1 kHz range, PLC signals have a significantly higher frequency (e.g., 10 kHz, 100 kHz, and greater) because they are transmitting as much information as possible within a time window.

In contrast, the present power signals, both large and small, are sent to discover the DERs systems 10 parameters close to the 50-60 Hz operating range. Signals in the kHz range do not provide that information and fade quickly in the lines (i.e., they do not reach very far) because the line impedance at those frequencies is typically very large. For PLC communications, the fading of the signal is a feature as communications can be localized, whereas fading in illustrative embodiments of the present invention is undesirable (worst case scenario can make the signals useless). Electrical power is provided in the United States at 60 Hz, while most other countries use 50 Hz. Thus, the power signals 30 preferably have a frequency that is at most 2-3×the frequency of the DERs system 10. Accordingly, in illustrative embodiments the signal 30 is within the range of, for example, between about 0.1 Hz and about 10 Hz. More specifically, illustrative embodiments may generate signals between the range of 0.5 Hz and about 3 Hz. While there is an upper limit on the frequency of the signal 30, the signal 30 may be the smallest non-zero frequency signal 30 that the controllable source 14 is able to generate.

The large signal 30 may be a variation of real and/or reactive power output that is more than 10% of the power rating of the controllable source 14 at that particular time. A plurality of large signals 30 may be injected by the controllable source 14. The large signal may be, for example, 20%, 40%, 60%, 80%, and 100% of the power rating of the controllable source 14. Injection of large power signals 30 may disrupt the operation of the DERs system 10. However, large power signals 30 allow significant information to be extracted from the network topology and parameters, including non-linear effects (such as performance curves of transformers). In some embodiments, because these tests are only performed a few times, slow effects (e.g., temperature or aging effects) may not be detected. Unknown power flows due to non-controllable assets (e.g., loads or renewables) further affect the analysis, so there may be limitations in the accuracy of the results if those power flows are not measured. In some embodiments, tests with large signals 30 may be performed when the DERs system 10 is coming online or after a major maintenance service. Furthermore, tests with large signals 30 may be performed over time at various power levels. For example, impedance values require the injection of two large signals, while transformer saturation curves require more (e.g., 5 or 6).

The small signal 30 does not disrupt the normal performance of the DERs system 10. The small power signal may be a variation of real and/or reactive power output that is less than 10% of the steady state output power of the controllable asset 14 at that particular time. For example, if a controllable asset is injecting 10 kW into the system, then a small power signal in this embodiment is a variation of less than 1 kW. In some embodiments, the small signal may be less than 8%, 7%, 6%, 5%, 4%, 3%, or 2% of the steady state output of the controllable asset 14 at that particular time. Preferably, the small signal 30 is less than 1% or 2% of the steady state output of the controllable asset 14 at that particular time. In illustrative embodiments, the small signal may be as small as 0.001% of the steady state output power of the system at that particular time. The small signal 30 may provide a small voltage (e.g., 1 volt), but is dependent on the controllability of the controllable source 14 and the precision and accuracy of the voltage sensors. It is expected that the voltage may be even smaller as technology improves and allows for finer and finer measurements. Thus, in some embodiments, the lower power limit of the small signal 30 is the power value that produces the smallest detectable voltage change. It should be noted that because of the size of the small signal 30, it does not disrupt the DERs system 10 operations, and it is possible to perform small signal 30 testing on a regular basis. Accordingly, network parameters that have relationships with slow variables, such as temperature, can be accounted for over the long term operation of the system.

Small signals 30 may be used to detect aging effects on network elements whose performance has degraded with age (such as transformers), providing early warnings for preventive maintenance. It should be noted that small test signals may linearize the network parameters around a given operation point so that non-linear effects are lost. In some embodiments, this is overcome by injecting the test signals at different operating points to re-construct the non-linear parameters in the network in a piece-wise linear manner. Small signal tests also are used in various embodiments to determine how the elements are connected to each other, providing information about the topology. Microgrid controllers generally have their own sensors (for temperature, humidity, etc.) to better correlate the impact of these variables on these network parameters.

Physical Characteristic Estimation

DERs are connected together and/or to a grid through network elements. Network elements are a medium through which electrical power flows to go from one point to another in the DERs system. Network elements include wires, transformers, power electronics interfaces, etc. In various embodiments, the large signal test and/or the small signal test, described above, may be used to accurately estimate physical characteristics of network elements. Specifically, illustrative embodiments determine a set of parameters of a mathematical model that defines a physical characteristic (e.g., impedance) of a given network element, and/or creates a data map of the functional relationship.

For example, when the DERs system 10 is newly built, a large signal test may obtain some initial value of the parameters (e.g., impedance). Then, by performing regular small signal tests, those parameters are validated, refined, and correlated with slow varying variables. In various embodiments, techniques disclosed herein may be used to calculate the DERs system topology and parameters in the DERs system 10 (and in electrical systems in general) by injecting predetermined power signals and observing their effect in voltage levels. For example, in the context of distributed microgrid 10 controllers, this approach is advantageous because of how distributed controllers are sited at various parts of the microgrid 10 and have the ability to send and analyze signals.

It should be apparent to a person of skill in the art that various embodiments of the network characterization as disclosed herein may be advantageous in one or more of the following use cases, including, but not limited to:

Military bases: For example, forward operating bases often do not run their generators in parallel, resulting in significant waste. This approach for determining droop coefficients could be extremely beneficial in maximizing generator efficiency and system stability.

Distribution networks: many utilities may not know which local power lines are at the risk of being overloaded. This approach for determining safety limits would be extremely helpful in identifying problematic areas for utility planning purposes.

Residential, Commercial and Industrial Buildings: smaller microgrid owners are often unaware of the health of their internal electrical network. This approach for determining network areas of high impedance would be helpful to determine if preventative repair and maintenance is needed.

Figure 9:
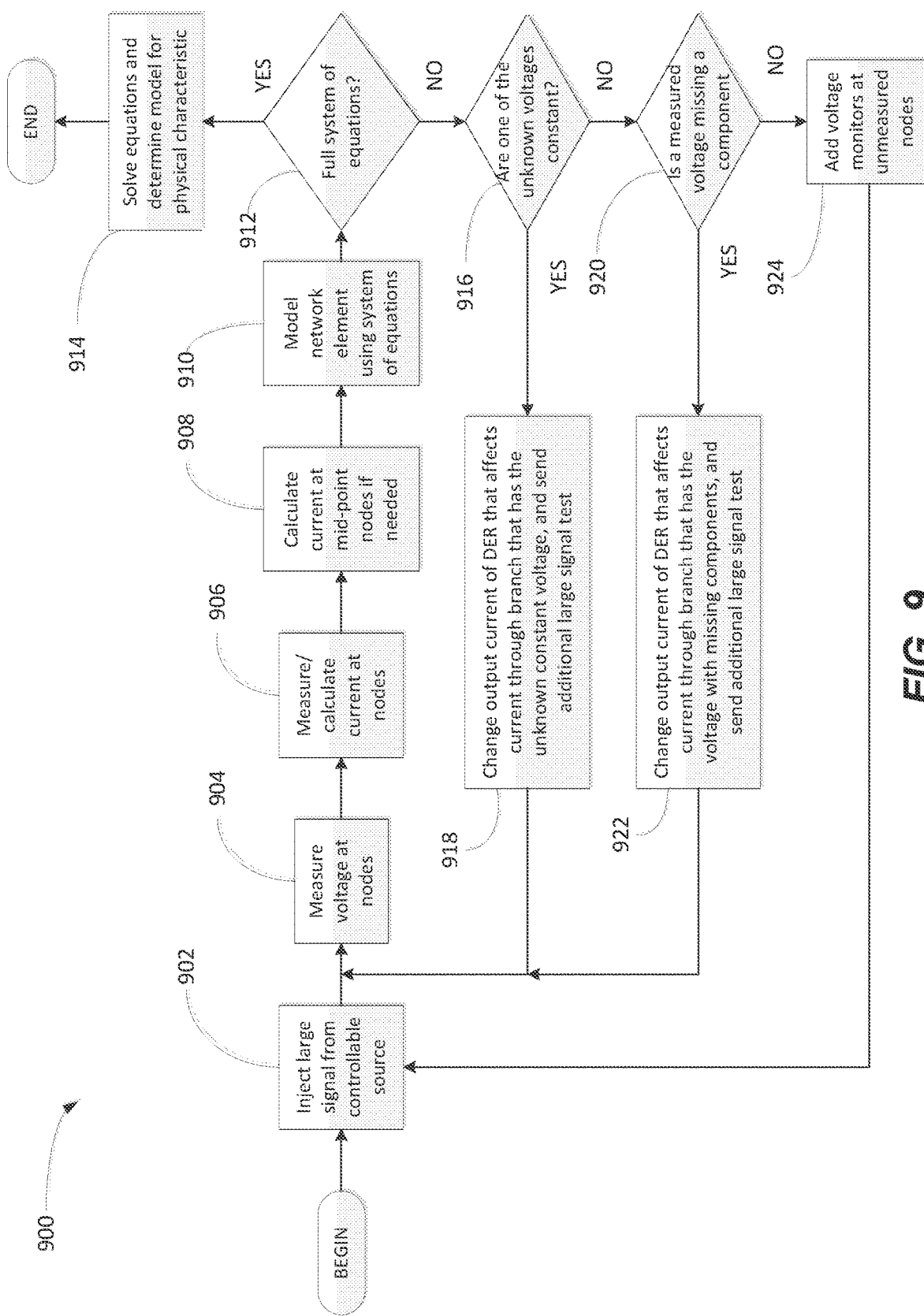
FIG. 9 shows a process of determining network characteristics using large signals in accordance with illustrative embodiments of the invention.

FIG. 9 shows a process 900 of accurately estimating a physical characteristic of the network element 32 in a DERs system in accordance with illustrative embodiments of the invention. To facilitate discussion of the process described in FIG. 9, reference is made to FIGS. 10-16. The process of FIG. 9 is substantially simplified from a longer process that may be used to determine network topology. Accordingly, the process can have many steps that those skilled in the art likely would use. In addition, some of the steps may be performed in a different order than that shown, or at the same time. Those skilled in the art therefore can modify the process as appropriate.

FIG. 10A schematically shows a diagram of the controllable source 14 connected to the master grid 28 via a power transmission line 32. At step 902 of the process, a large signal 30 is injected by the controllable source 14. As described previously, the controllable source 14 is capable of measuring its terminal voltage and injecting a desired value of real (P) and/or reactive (Q) power into the DERs system 10. In this example, the controllable source 14 connects to a stiff source (e.g., grid 28) that sets the voltage and frequency at its node (also called master, grid-forming or slack bus). The slack bus 28 and the controllable source 14 are connected through the network element 32, which has a generic relationship between voltage and current.

When electrical power crosses the network element 32, there is a voltage drop ($\Delta V$) across it. The voltage drop ($\Delta V$) is a function of the current across it (i.e., ($\Delta V = f(I)$), as well as other variables (e.g., temperature). Depending on the network element 32 and the type of current (i.e., AC v. DC), the functional relationship of voltage drop with respect to current may be linear or non-linear. Combining several of these branches creates a DERs network.

As a person of skill in the art knows, voltage in the node and/or the branch current may be defined by more than one number. For example, Direct current systems like DC microgrids, $V_A$, $V_B$ and I are single numbers (i.e., scalar quantities). However, 3-phase unbalanced alternating current circuits, voltages and current are composed of six numbers, either two for each phase or a different formulation such as symmetrical components. Additionally, in 3-phase balanced alternating current circuits, voltages and current are composed of two numbers. Thus, reference to several components of a single voltage and current is made using the well-known notation $V_A = \{V_{A,1}, V_{A,2}, V_{A,3}, \text{etc.}\}$, where A1, A2, and A3, represent three different components of the voltage at node A.

Furthermore, as known in the art, bolded variables represent vectors, whereas unbolded or standard font variables represent scalar numbers.

In illustrative embodiments, a plurality of large signals are actively injected to develop an accurate mathematical model of the physical characteristic of the network element 32. After each large signal is injected (e.g., as current I, or power), the voltage drop across the network element 32 is monitored and related to the distinct current value flowing through the network element 32.

Figure 11A:
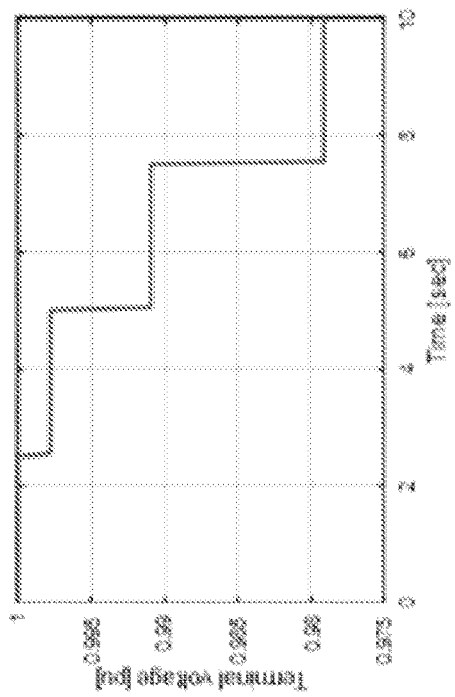
FIG. 11A schematically shows the large real power test signal having four different real power levels, injected by the controllable source in accordance with illustrative embodiments of the invention.
Figure 11B:
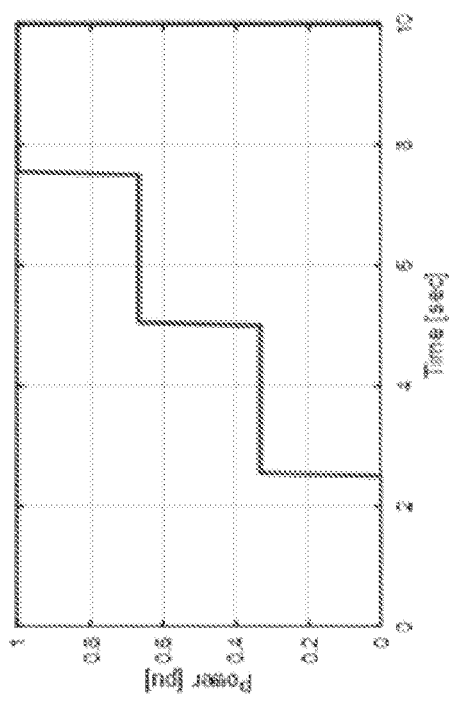
FIG. 11B schematically shows the resulting terminal voltage in per-unit measured at the controllable source in accordance with illustrative embodiments of the invention.
Figure 11C:
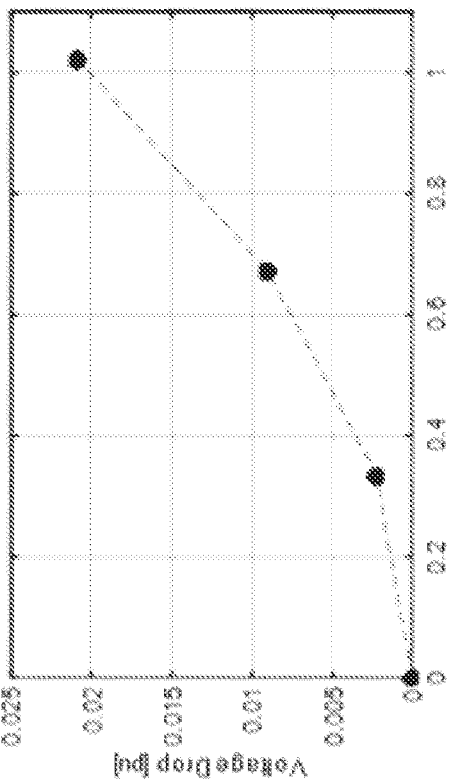
FIG. 11C schematically shows the quadratic relationship between voltage drop and current in accordance with illustrative embodiments of the invention.

FIG. 11A schematically shows four different real power levels, three of which are test signals injected by the controllable source 14 in accordance with illustrative embodiments of the invention. FIG. 11B schematically shows the resulting terminal voltage in per-unit (i.e., the slack bus voltage equal to 1) measured at the controllable source. From these two plots it is possible to estimate the quadratic relationship between the voltage drop magnitude and the power level. FIG. 11C schematically shows the quadratic relationship between voltage drop and current.

To discover such non-linear relationships, the large power signals 30 are injected into the DERs system 10, either controlled specifically for parameter detection or during the natural operation of the system. However, in some embodiments, injecting the large power signal 30 may disrupt the DERs system's 10 operation, which may be undesirable in some cases.

As shown in FIG. 11C, the voltage drop and current have a relationship that can be modeled as a quadratic equation. When modeling any relationship, the equation has a set of unknown parameters:

$$a = [a_1, a_2, \ldots, a_N]$$

In illustrative embodiments, the voltage at the controllable source 14 is known, as is the voltage at the other end of the branch. Furthermore, the value of the current injected through the network element 32 is also known (because it is actively injected by the controllable source 14).

Returning to FIG. 9, the next step 904 in the process is to measure the voltage at the nodes. Thus, illustrative embodiments measure two values: $V_A$, and $V_B$. The nodes may be measured, for example, by the voltmeter 22 in the asset manager 16. The next steps 906 and 908 in the process measure/calculate the current at the nodes. Calculating the current at the midpoint nodes 908 is described in further detail below. The current I at the edge nodes (e.g., at the DERs) is generally known because that value is controlled by the DER. These controlled/measured parameters $V_A$, $V_B$, and I are referred to herein as a "triplet" or S. However, as shown in FIG. 11A, multiple measurements may be taken using different large signals (e.g., current signal). As described previously, the voltage drop across the network element 32 (i.e., $V_A - V_B$) is a function of current.

Step 910 models the one or more network elements using a system of equations. The system of equations models the voltage drop across the network element 32 as a function of the injected large current signal (e.g., first test signal $I^{(1)}$, second test signal $I^{(2)}$, etc.):

$$V_A^{(1)} - V_B^{(1)} = f(I^{(1)}, a)$$

$$V_A^{(2)} - V_B^{(2)} = f(I^{(2)}, a)$$

$$\vdots$$

$$V_A^{(N/m)} - V_B^{(N/m)} = f(I^{(N/m)}, a)$$

In illustrative embodiments, for N unknown parameters (e.g., impedance usually has two unknown parameters: resistance and reactance) in the mathematical model, N/m triplets are measured, where m is the number of components of que quantity. A person of skill in the art understands that current, voltage and power should all have the same number of components depending on the type of system. For example, each has a single component in a DC system (i.e., m=1), two components in a balanced three-phase systems (i.e., m=2), and six components in an unbalanced three-phase system (i.e., m=6). This technique is used to determine the "N" unknown parameters for an equation that models a single network element 32.

Figure 12:
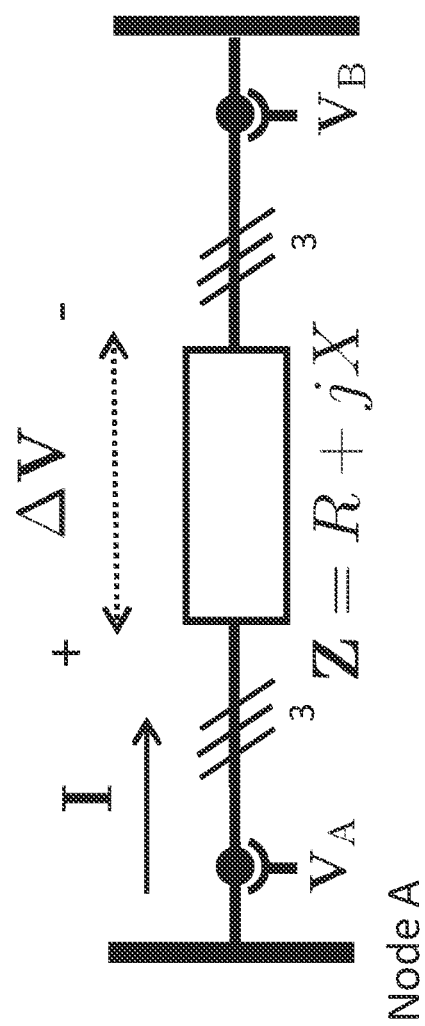
FIG. 12 schematically shows a branch of the DERs system in accordance with illustrative embodiments of the invention.

FIG. 12 schematically shows a branch of the DERs system. Illustrative embodiments may estimate the impedance of the network element 32 shown. For the purposes of this example, assume that the system is a balanced 3-phase system. As in all balanced three-phase systems, voltages and currents are described with two numbers. A person of skill in the art knows that these numbers can be described using polar coordinates (i.e., magnitude and phase) or Cartesian coordinates (i.e., D-Q axis values).

| Polar Coordinates: | Cartesian Coordinates: |
| --- | --- |
| $I = |I| \angle \delta$ | $I = I_d + jI_q$ |
| $V_A = |V_A| \angle \delta_A$ | $V_A = V_{Ad} + jV_{Aq}$ |
| $V_B = |V_B| \angle \delta_B$ | $V_B = V_{Bd} + jV_{Bq}$ |

When modeling for impedance, there may be 2 unknown components called resistance (R) and reactance (X):

$$a = [R, X]$$

In illustrative embodiments, a set of triplets $$S^{(i)} = [V_A^{(i)}, V_B^{(i)}, I^{(i)}]$$

may be measured/known. The $^{(i)}$ is an index to identify different triplets. Thus, with a single measurement of voltage at node A, voltage at node B, and the current running through the network element 32, two equations can be solved for the unknown components, R and X.

$$V_{A,1}^{(1)} - V_{B,1}^{(1)} = RI_1(1) + XI_2^{(1)}$$

$$V_{A,2}^{(1)} - V_{B,2}^{(1)} = RI_2^{(1)} - XI_1^{(1)}$$

Figure 13:
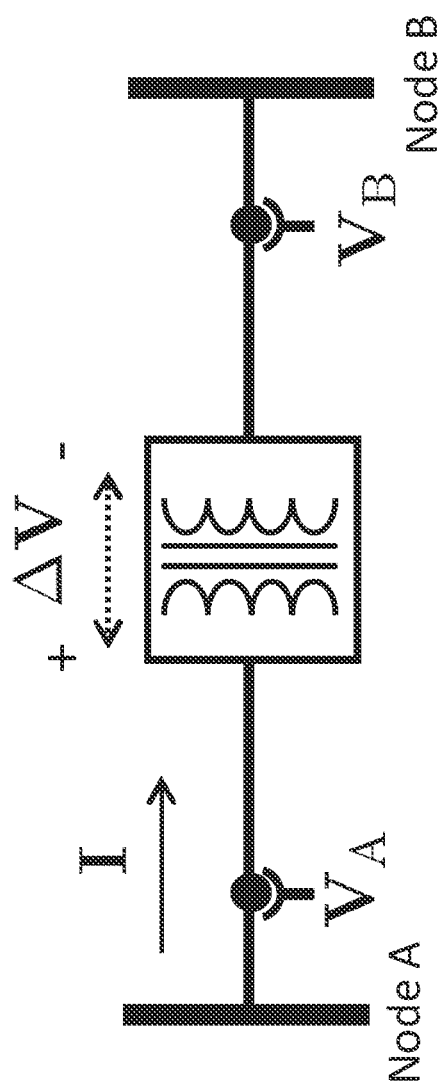
FIG. 13 schematically shows a branch of the DERs system having a transformer as the network element in accordance with illustrative embodiments of the invention.

FIG. 13 schematically shows a branch of the DERs system having a transformer as the network element 32. In this example, the DERs system is a 1-phase AC system. Because it is a 1-phase AC system and the voltage drop in a transformer usually does not depend on phase, only the voltage of the magnitude is significant. Using known equations, the voltage drop across the particular node may be modeled as follows:

$$V_A^{(1)} - V_B^{(1)} = a_1 I^{(1)} + a_2 (I^{(1)})^2$$

$$V_A^{(2)} - V_B^{(2)} = a_1 I^{(2)} + a_2 (I^{(2)})^2$$

$V_A^{(1)}$, $V_A^{(2)}$, $V_B^{(1)}$, $V_B^{(2)}$, $I^{(1)}$, and $I^{(2)}$ are measured parameters (e.g., $I^{(1)}$ is the first test current injected, $V_A^{(1)}$ is voltage at node A caused by $I^{(1)}$, $V_B^{(1)}$ is the voltage at node B caused by $I^{(1)}$, and $I^{(2)}$ is the second test current injected, $V_A^{(2)}$ is voltage at node A caused by $I^{(2)}$, $V_B^{(2)}$ is the voltage at node B caused by $I^{(2)}$). Thus, 2 unknown parameters exist in the system of equations: $a=[a_1, a_2]$.

The next step 912 in the process 900 asks whether there is a complete system of equations. Because there are 2 unknown parameters in this example, at the system of equations requires at least two equations. If there were 3 unknown parameters, illustrative embodiments would require at least three equations, and thus, could take a third measurement of the triplets:

$$S^{(i)} = [V_A^{(i)}, V_B^{(i)}, I^{(i)}],$$

Figure 14A:
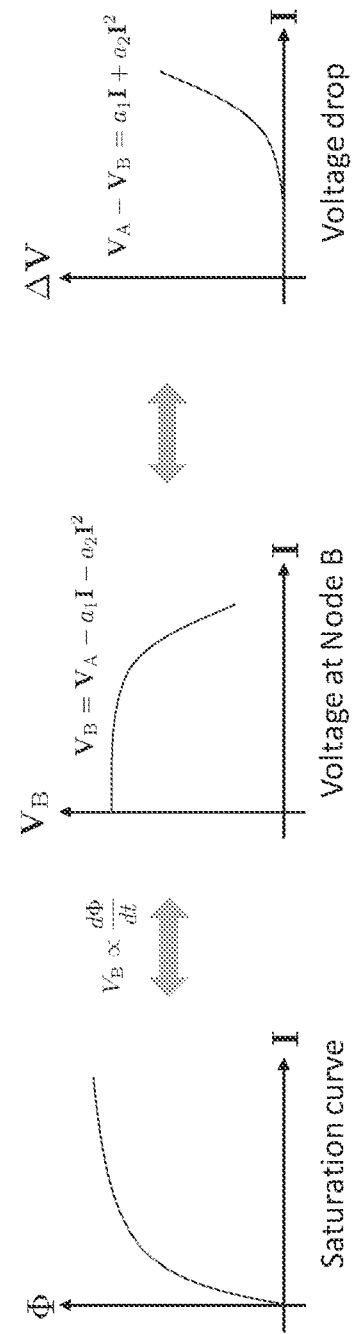
FIG. 14A schematically shows the modeled saturation curve of the transformer, the voltage at Node B as a function of the injected test signals, and the voltage drop as a function of injected test signals in accordance with illustrative embodiments of the invention.

FIG. 14 schematically shows the modeled saturation curve of the transformer, the voltage at Node B as a function of the injected test signals, and the voltage drop as a function of injected test signals.

If the full system of equations is developed, the process proceeds to step 914 where the equations are solved using well known non-linear or linear solvers such as Trust-Region algorithms, which solve for the value of the unknown parameters contained in a. The process then comes to an end. However, if the characteristic analysis engine 27 does not have the full system of equations, the process proceeds to step 916. It is likely that in multi-branched DERs systems that the full system of equations is not obtained on the first cycle of steps 902-910.

At step 916, the process asks whether one of the unknown voltages can be considered to be constant. This is frequently to be the case at one of the edge nodes, where the system connects to a stiff grid or where a Master source (i.e. the one setting the voltage and frequency) is located. The voltage at the grid connection is approximately constant, but unknown. Accordingly, instead of measuring triplets, $S^{(i)} = [V_A^{(i)}, V_B^{(i)}, I^{(i)}]$, duplets are measured $S^{(i)} = \{V_A^{(i)}, I^{(i)}\}$ (e.g., $V_b$ is unknown). In illustrative embodiments, the unkown voltage (e.g., $V_b$) is treated as an unknown parameter, requiring an extra measurement to solve the system of equations. That means that for "N" unknown parameters in the network element, "(N/m+1)" duplets should be measured, where m is the number of components.

Thus, if the unknown voltage is constant, the process proceeds to step 918. At step 918, a second large test signal 30 may be sent through the branch that has the unknown constant voltage. Specifically, the output current (or power) of the DER that affects the current through the branch is adjusted. Thus, for example, the first large test signal may be 40% of the power rating of the DER, and the second large test signal may be 90% of the power rating of the DER. The process then returns to step 904 and repeats.

Accordingly, the system of equations may be:

$$V_A^{(1)} - V_0 = f(I^{(1)}, a)$$

$$V_A^{(2)} - V_0 = f(I^{(2)}, a)$$

$$\vdots$$

$$V_A^{(N)} - V_0 = f(I^{(N)}, a)$$

$$V_A^{\left(\frac{N}{m}+1\right)} - V_0 = f\left(I^{\left(\frac{N}{m}+1\right)}, a\right)$$

Where the unknown constant voltage $V_B = V_0$, and the unkwown parameters of the functional relationship are $a=[a_1, a_2, \ldots, a_N]$ If all of the unknown voltages are not constant, the process proceeds to step 920. Step 920 asks whether any of the measured voltages are missing a component. For example, frequently DERs may measure voltage magnitude, but not the phase of the voltage. This is because in AC systems, synchronized clocks are required across the system to measure phase. Frequently, DERs include a voltage magnitude measurement without a phase measurement. If yes, then the process proceeds to step 922. At step 922 the unknown component (e.g., phase) is treated as an extra unknown variable in the system of equations. Thus, an additional equation is added to the system, and an additional measurement of a triplet or duplet is required.

In illustrative embodiments, the additional equation is a known equation h(x) that relates the unknown components (e.g., phase) of a variable to the measured quantity (e.g., magnitude). This method assumes that the current, I, measurement has all the components, which is not uncommon. Generally, (AC systems where voltage magnitude is known but not phase), the phase of the current can be obtained with the power factor.

Thus, the system of equations that is solved simultaneously may be described as:

$$V_A^{(1)} - V_B^{(1)} = f(I^{(1)}, a)$$

$$V_A^{(2)} - V_B^{(2)} = f(I^{(2)}, a)$$

$$\vdots$$

$$V_A^{(N)} - V_B^{(N)} = f(I^{(N)}, a)$$

$$V_A^{(N+1)} - V_B^{(N+1)} = f(I^{(N+1)}, a)$$

$$h(V_{A,j}) = V_{A,k}$$

where
$V_{A,j}$ is known or measured (e.g., magnitude), and
$A_{A,k}$ is unknown (e.g., phase).

Accordingly, the system of equations has an extra measurement and an additional equation (used to relate the unknown components to a measured quantity).

Returning to FIG. 12, assume that the magnitude of voltage A is known, but the phase of voltage A is not known. Accordingly, the unknown parameters are the same as described previously: a=[R, X]. However, there is also the unknown phase component for voltage A, $\delta_A$. In illustrative embodiments, a second test signal 30 is sent at a different current value (e.g., first large test signal is at 40% power rating, and second large test signal is at 100% power rating). Thus, the unknown variables can be solved using the originally defined equations for two different test signals:

$$V_{A,1}^{(1)} - V_{B,1}^{(1)} = RI_1^{(1)} + XI_2^{(1)}$$

$$V_{A,2}^{(1)} - V_{B,2}^{(1)} = RI_2^{(1)} - XI_1^{(1)}$$

$$V_{A,1}^{(2)} - V_{B,1}^{(2)} = RI_1^{(2)} + XI_2^{(2)}$$

$$V_{A,2}^{(2)} - V_{B,2}^{(2)} = RI_2^{(2)} - XI_1^{(2)}$$

However, to determine the phase component of $V_A$, $V_{A,2}$, the system of equations may include a well-known equation for relating the magnitude of voltage A with the phase of voltage A, such as:

$$[(V_{A,1}^{(1)})^2 + (V_{A,1}^{(1)})^2]^{\frac{1}{2}} = |V_A|^{(1)}$$

$$[(V_{A,1}^{(2)})^2 + (V_{A,2}^{(2)})^2]^{\frac{1}{2}} = |V_A|^{(2)}$$

Accordingly, a mathematical model for impedance can once more be determined.

If there are no more measured voltages missing a component, the process proceeds to step 924, where voltage monitors are added, particularly at nodes that do not currently have voltage monitoring. More voltage monitors are required, so that more voltage measurements may be taken, so that the full system of equations may be solved. Additionally, or alternatively, illustrative embodiments may construct data maps.

Figure 14B:
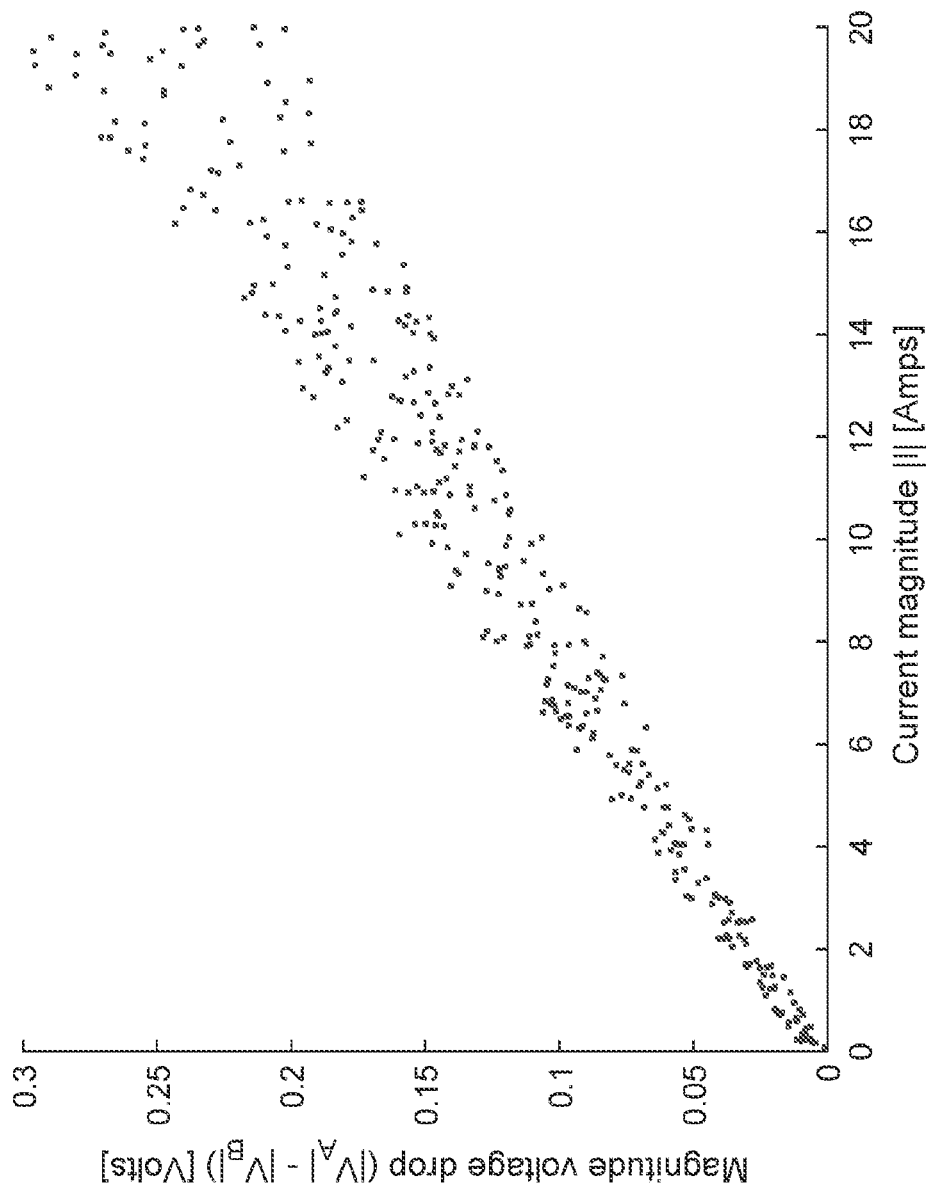
FIG. 14B schematically shows a data map of the sampled voltage drop across the transformer in accordance with illustrative embodiments of the invention FIG. 15 schematically shows the DERs system having three branches, and each branch has a respective network element in accordance with illustrative embodiments of the invention.

Thus far, the examples provided calculate a series of parameters that model an equation. However, it is possible that fitting an equation into a physical property might not be possible or desirable (e.g., not enough voltage monitoring). In those cases, it may be preferable to store the measured triplets (along with any other important variable such as ambient temperature). All the data can be stored and machine learning techniques can be employed afterwards to fit a curve, and quantify the effect of external parameters. In the case of the transformer saturation that has a non-linear relationship between voltage drop and current, the transformer can be sampled at different operating point, instead of trying to fit an equation directly. FIG. 14B schematically shows a data map of the sampled voltage drop across the transformer in accordance with illustrative embodiments of the invention. Illustrative embodiments may create data maps similar to the ones shown in FIG. 14B. The process eventually returns to step 912, where a full system of equations is achieved, and then solved at step 914. The process then comes to an end.

For simplicity, the above examples have been described as injecting current test signals. However, illustrative embodiments may inject power test signals. Indeed, many DERs have controllable power output, but do not have controllable current output. Thus, illustrative embodiments may preferably use large power signals 30.

Because power and current are related through voltage, an equation can be used to relate power to current. Using the power method, the current may be an unknown quantity (e.g., all components of current), but all components of power (i.e., real and reactive power) are generally known and controlled. Therefore, illustrative embodiments add the power-current relationship equation into the system of equations to be solved simultaneously. The current-power relationship is a known equation, which is represented here for discussion purposes by P=(I,V). Thus, each component of power is related to this equation:

$$P_1^{(i)} = g(I^{(i)}, V_A^{(i)}, V_B^{(i)})$$

$$P_2^{(i)} = g(I^{(i)}, V_A^{(i)}, V_B^{(i)})$$

$$\vdots$$

$$P_m^{(i)} = g(I^{(i)}, V_A^{(i)}, V_B^{(i)})$$

As discussed previously, the voltage drop across the network element is a function of the current and the parameters that define the mathematical model:

$$V_A^{(i)} - V_B^{(i)} = f(I^{(i)}, a)$$

If the number of components of voltage, current and power is "m", and the number of unknown parameters is "N", then we have "2·N" equations "2·N" unknowns. Measurements (i) are repeated for N/m measurements on the system of equations:

$$V_A^{(i)} - V_B^{(i)} = f(I^{(i)}, a)$$

$$P_1^{(i)} = g(I^{(i)}, V_A^{(i)}, V_B^{(i)})$$

$$P_2^{(i)} = g(I^{(i)}, V_A^{(i)}, V_B^{(i)})$$

$$\vdots$$

$$P_m^{(i)} = g(I^{(i)}, V_A^{(i)}, V_B^{(i)})$$

For example, in a balanced 3-phase system, the power components are the 3-phase real power (P) and reactive power (Q), thus, the system of equations has 4 equations:

$$V_{A,1}^{(1)} - V_{B,1}^{(1)} = RI_1^{(1)} + XI_2^{(1)}$$

$$V_{A,2}^{(1)} - V_{B,2}^{(1)} = RI_2^{(1)} - XI_1^{(1)}$$

$$P^{(1)} = \frac{3}{2}(V_{A,1}^{(1)} I_{A,1}^{(1)} + V_{A,2}^{(1)} I_{A,2}^{(1)})$$

$$Q^{(1)} = \frac{3}{2}(V_{A,1}^{(1)} I_{A,2}^{(1)} - V_{A,2}^{(1)} I_{A,1}^{(1)})$$

The measured parameters are $S^{(i)} = [V_A^{(i)}, V_B^{(i)}, P^{(i)}]$, $V_A^{(i)}$ has two components, $V_{A1}^{(i)}$ and $V_{A2}^{(i)}$ because this is a balanced 3-phase system. In a similar manner, $V_B^{(i)}$ has two components, $V_{B1}^{(i)}$ and $V_{B2}^{(i)}$ because this is a balanced 3-phase system (e.g., D-Q axis voltages). $P^{(i)}$ has two components, real power P and reactive power Q. The unknown parameters that are determined through the equations are a=[R, X].

Although the above described examples relate to characterization of a single network element, illustrative embodiments extend to large systems with many network elements. In large systems, edge nodes where a DER or a grid is connected are distinguishable from mid-point nodes where branches connect together but there are no other DERs or grid connections. In large systems, illustrative embodiments independent analyze each branch/network element.

For branch α connecting nodes j and k:

$V_j^{(i)} - V_k^{(i)} = f_\alpha(I_\alpha^{(i)}, a_\alpha)$

Measure $N_\alpha$ triplets depending on the unknown parameters for network element $\alpha$. This will lead to $N = \Sigma_\alpha^M N_\alpha$ equations that have to be solved simultaneously, where M is the number of branches in the system.

Figure 15:
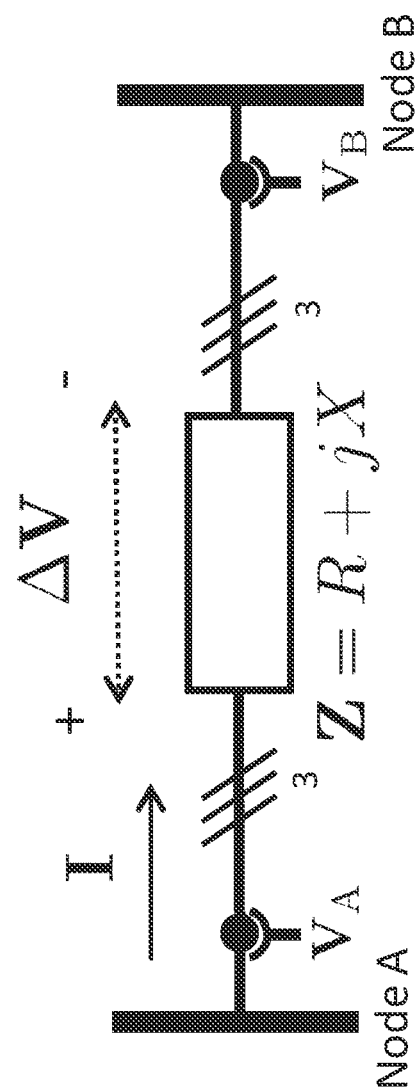

FIG. 15 schematically shows a DERs system having three branches, and each branch has a respective network element. Thus, in illustrative embodiments the DER at Node A injects a first test signal $I_1$. The measured/known components thus include:

$S_1^{(i)}[V_A^{(i)}, V_C^{(i)}, I_1^{(i)}]$ $V_A$, and $V_C$ are measured. $I_1$ is known because current is controlled by the DER, or because power is injected by the DER and then related to current using an equation as described previously.

A second test signal $I_2$ is injected by the DER at Node B. The measured/known components thus include:

$S_2^{(i)}[V_B^{(i)}, V_C^{(i)}, I_2^{(i)}]$ $V_B$, and $V_C$ are measured. $I_2$ is known because current is controlled by the DER, or because power is injected by the DER and then related to current using an equation as described previously.

A third triplet may also be measured, $S_3^{(i)}[V_C^{(i)}, V_D^{(i)}, I_3^{(i)}]$. However, provided that Node C is a mid-point node, and no DER exists there, the current $I_3$ is an aggregate of $I_1$ and $I_2$ (using Kirchhoff's current law). Accordingly, the system of equations is as follows:

$V_A^{(i)} - V_C^{(i)} = f_1(I_1^{(i)}, a_1) \; N_1$ measurements $V_B^{(i)} - V_C^{(i)} = f_2(I_2^{(i)}, a_2) \; N_2$ measurements $V_C^{(i)} - V_D^{(i)} = f_3(I_3^{(i)}, a_3) \; N_3$ measurements In illustrative embodiments, $I_1$ and $I_2$ are injected within a brief period of time from one another (i.e., within seconds). Accordingly, effects of temperature and uncontrolled loads do not significantly impact the mathematical model defined by the system of equations.

Returning to FIG. 9, steps 906-908 measure all of the measurable currents. In simple cases having a single branch, the current is controlled directly or indirectly by the DER. However, in more complex cases with many branches, the current through a given branch may not be directly controlled by a single DER. However, not all currents in the system need to be measured directly, as some can be calculated through Kirchhoff current law. For example, this occurs in mid-point nodes where several branches meet, but there might not be measurement of current through one branch (most typically when that branch goes to another mid-point node).

Figure 16:
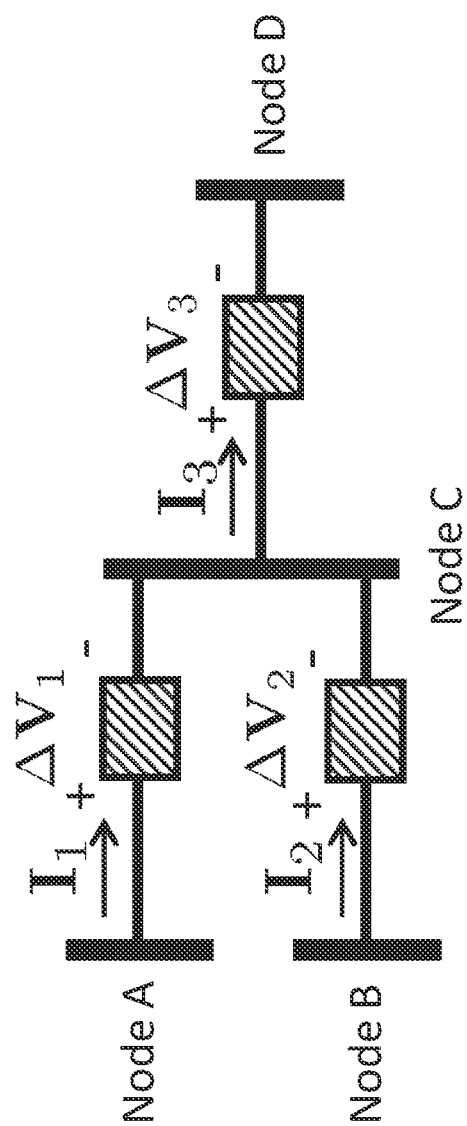
FIG. 16 schematically shows a DERs systems with a plurality of branches in accordance with illustrative embodiments of the invention.
Figure 17A:
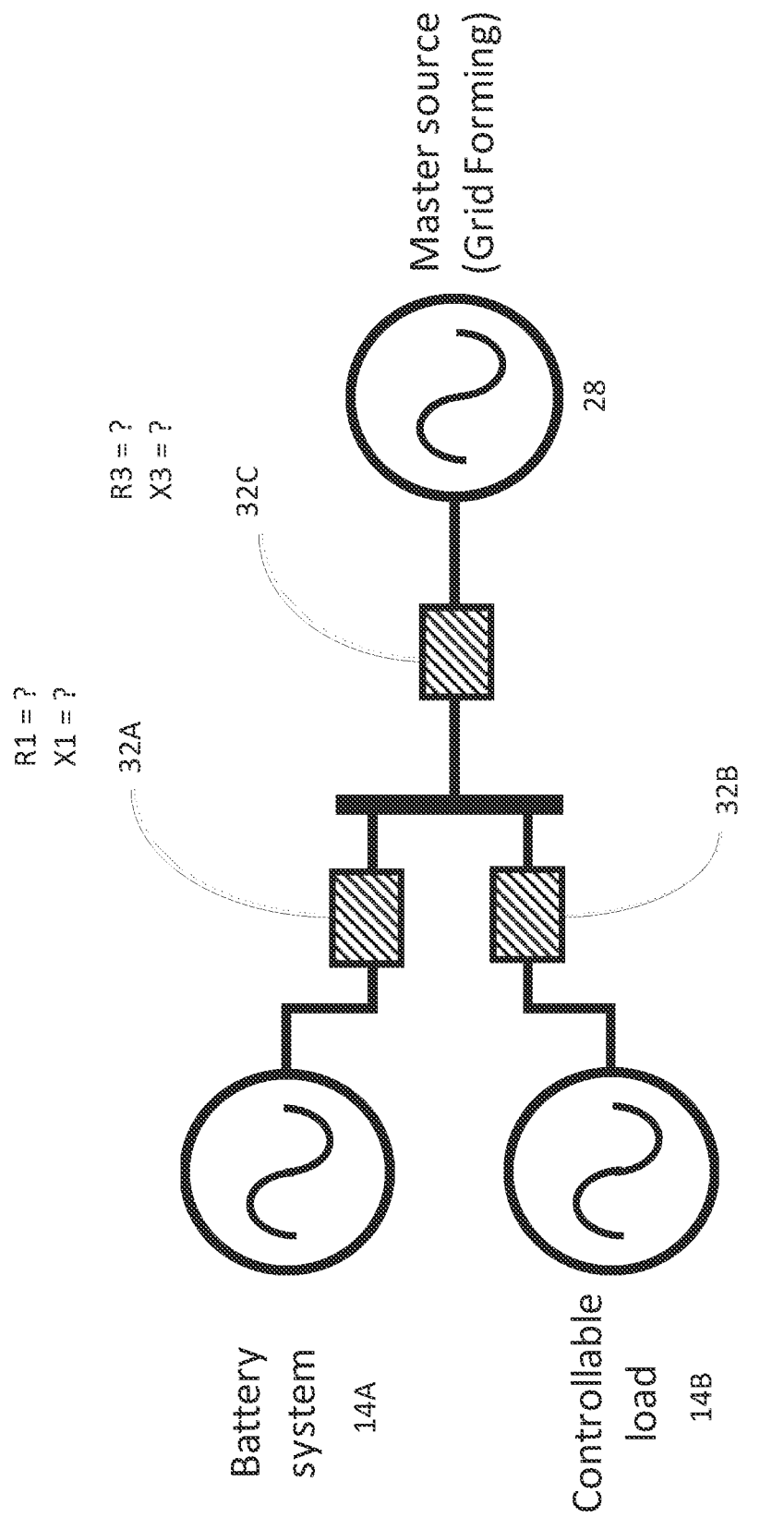
FIG. 17A shows the DERs system having a battery, a controllable load, and a master source acting as the grid forming device.

FIG. 16 schematically shows a DERs systems with a plurality of branches in accordance with illustrative embodiments of the invention. Generally, the current of all edge nodes A, B, E, and F is known. This includes all currents except for $I_3$. $I_5$ is an edge current, so for purposes of this example assume that the DER is measuring it. In order to solve the equation, we must determine the parameters $S_\alpha^{(i)} = [V_i^{(i)}, V_k^{(i)}, I_\alpha^{(i)}]$ for alpha=1, 2, 3, 4, and 5. Thus, the system of equations used to mathematically model the physical characteristics of a given network element is:

$V_j^{(i)} - V_k^{(i)} = f_\alpha(I_\alpha^{(i)}, a_\alpha)$ For $\alpha = 1, 2, 3, 4, 5$ $I_3 = I_1 + I_2$ FIGS. 17A-17C schematically show an example of using a mathematical model in accordance with illustrative embodiments of the invention. Specifically, FIG. 17A shows the DERs system having a battery 14A, a controllable load 14B, and a master source acting as the grid 28 forming device (i.e., holding voltage and frequency constant). Both the battery 14A and the controllable load 14B have an asset manager 16. There are three network elements 32A, 32B, and 32C. The network elements 32A, 32B, and 32C have unknown variables R1, X1; R2, X2; and R3, X3, respectively. FIG. 17B-17C schematically shows parameters controlled and measured by the asset manager 16.

The asset managers 16 are in communication with a central controller 12. The asset manager 16A of the battery 14A instructs the battery to put out a first large test power signal 30A including real power $P_1$ and reactive power $Q_1$. Accordingly, both of these values are known. Additionally, the asset manager 16B of the controllable load 14B instructs the controllable load to put out a second large test power signal 30B including real power $P_2$ and reactive power $Q_2$.

The asset managers 14A and 14B include voltmeters 22. Thus, the magnitude of the voltage from the first large test signal 30A can be measured. The voltage at the grid 28, $V_C$, and the phase of the voltage at the grid $\delta_C$ is constant and known. A number of equations, as explained above, can be derived for each of the branches. As shown Branch 1 has equations 80, Branch 2 has equations 82, and Branch 3 has equations 84. Because power was injected, instead of current, power-current relationship equations 86 are included, as discussed previously. Furthermore, because the phase of the voltage at 14A and 14B was not known, an equation h(x) 88 that relates an extra measurement to the component is included. Furthermore, the current entering at the midpoint node of Branch 3 84 is unknown. As discussed previously, an equation is included to relate determine the current at the midpoint node.

The physical characteristic analysis engine 27 has 14 equations and 16 unknowns, accordingly, there is not a full system of equations. In illustrative embodiments, a second large signal injection 30C, 30D is sent from the battery system 14A and/or from the controllable load 14B. The process described in FIG. 17B is repeated. Equations 86 that define the power-current relationship are included, as well as an equation h(x) 88 that relates an extra measurement to the phase of the voltage. The characteristic analysis engine 27 now has an additional 14 equations, but only and additional 11 unknowns. The twenty-eight total equations now outnumber the twenty-seven total unknown variables, making it possible to solve the equations. Accordingly, the characteristic analysis engine 27 has a full set of equations, and determines the unknown variables: R1, X1, R2, X2, R3, and X3.

Small Signal

Figure 18A:
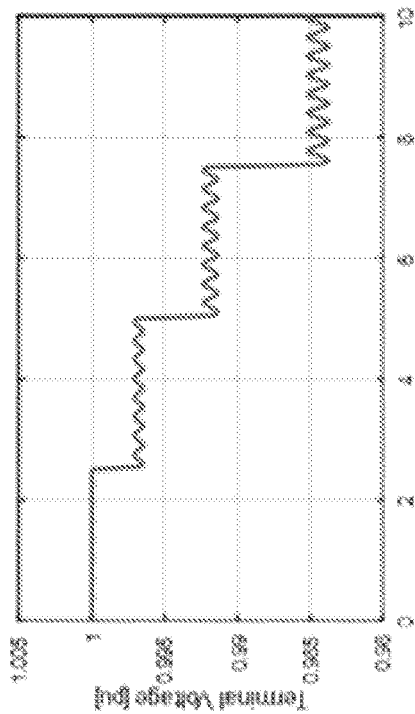
FIG. 18A schematically shows the injected small test signal as a sinusoidal with a peak at 2% of the nominal power rating of the DER in accordance with illustrative embodiments of the invention.
Figure 18B:
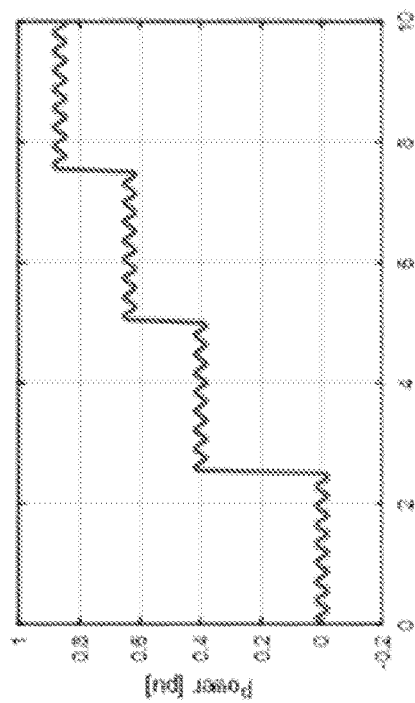
FIG. 18B schematically shows the resulting terminal voltage at the controllable source.
Figure 18C:
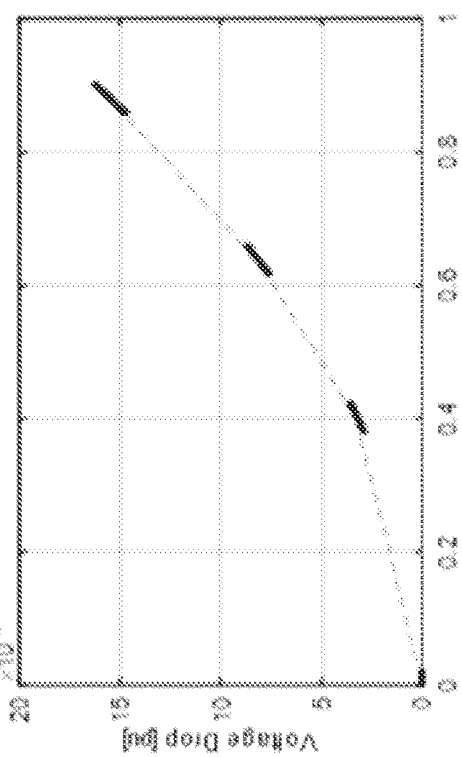
FIG. 18C shows the quadratic current-to-terminal voltage relationship.

The above description refers to the use of large signals. Additionally, or alternatively, the DERs system 10 may operate freely (i.e., following a certain dispatch logic) and small signals 30 may be injected on top of the regular operation of the DERs system. For illustration purposes, assume that the injected small test signal is sinusoidal with the peak at 2% of the nominal power rating (as shown in FIG. 18A). This is done at several power levels determined by the normal operation of the microgrid. The resulting terminal voltage at the controllable source 14 is shown in FIG. 18B. As shown, voltage drop increases as power increases. The quadratic current to terminal voltage relationship is shown in FIG. 18C. The current-voltage relationship was assumed to be quadratic for the purposes of explanation. The small signal technique allows us to discover the appropriate parameters of the equation. It is possible to see how the linear behavior around a given operating point is observed and by applying the technique at different operating points, the full relationship is obtained.

If the relationship of voltage drop to current is linear (line impedances exhibit linear relationships), the above approach still applies, as this is a subset of the generalized quadratic case. In fact, the linear relationship results in simpler implementation because the large signal and small signal tests would provide the same information.

In the simplest case, this element 32 is the wires connecting the controllable source 14 and the slack bus 28. The element 32 has an impedance and thus, imposes a linear relationship of the form (for three phase balanced systems):

$$\Delta v_d = Ri_d + Xi_q \quad \Delta v_q = Ri_q - Xi_d$$

However, to illustrate how the proposed method works in a more generic case, element 32 is modeled using a quadratic relationship between the voltage drop magnitude in the element 32 and the current, such that:

$$|\Delta V| = k|I|^2$$

In a general case, we could also consider the angle change, but we can ignore it for simplicity purposes in this explanation. For a balanced three-phase system, there are several ways this magnitude relationship can occur, but consider the following:

$$\Delta v_d = k i_d |I|$$

$$\Delta v_q = k i_q |I|$$

where $v_d$, $v_q$ are the dq-axis voltage drops, and $i_d$, $i_q$ are the dq-axis currents through the non-linear element 32.

Figures 19A, 19B:
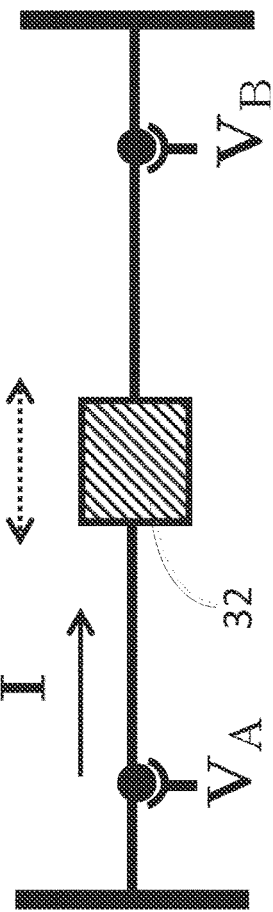
FIGS. 19A-19B schematically shows the controllable source connected to the slack bus in accordance with illustrative embodiments of the invention.
Figure 20:
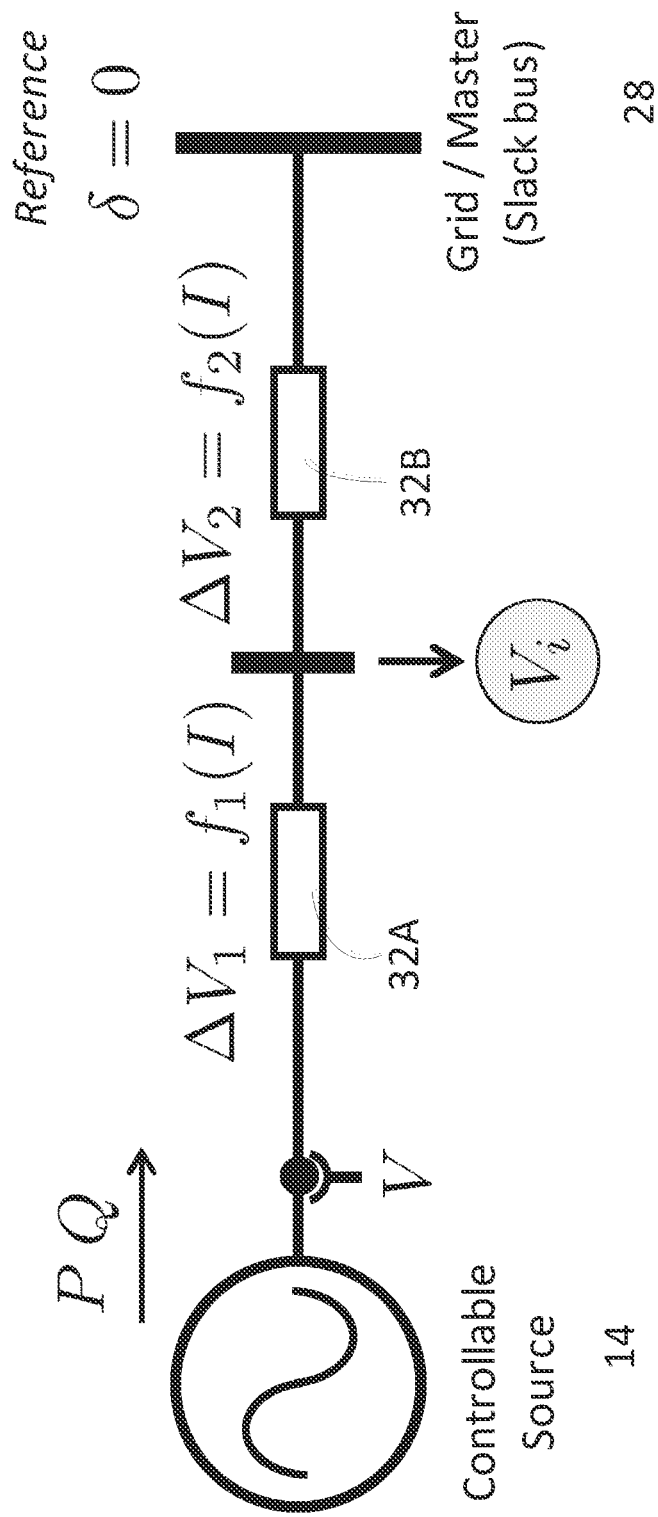
FIG. 20 schematically shows a diagram splitting the connecting line on FIGS. 19A-19B in accordance with illustrative embodiments of the invention.

The previous example used a very simplified system 10 with only one controllable source 14 and a slack bus 28. However, the overall concept may be extended to systems 10 with multiple controllable sources 14 and many branches. The main idea behind this extension is that if splitting the line 32 connecting the controllable source 14 and the slack bus 28 in FIG. 19A, results in a third bus (as shown in FIG. 20). However, it is important to note that if there is no monitoring at that node, then it is not possible to figure out where the split occurred (since it is an arbitrary position). FIG. 20 schematically shows a diagram splitting the connecting line in two in accordance with illustrative embodiments of the invention. As shown in FIG. 20, a person of skill in the art will understand that measuring the terminal voltage at the midpoint node ($V_t$) allows for the calculation of two distinct voltage drops ($\Delta V_1$ and $\Delta V_2$).

Figure 21:
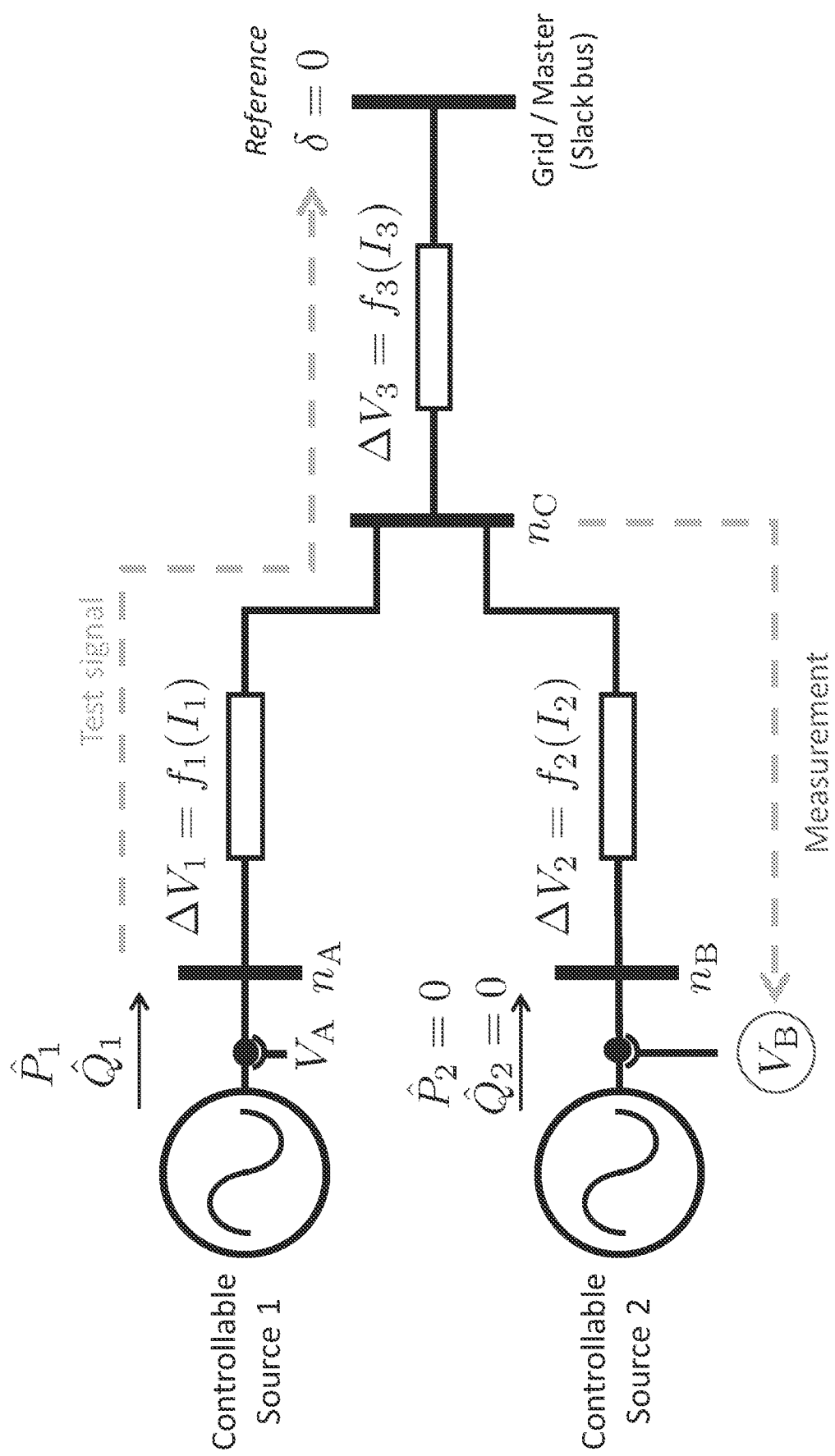
FIG. 21 schematically shows using small signal testing in accordance with illustrative embodiments of the invention.

Monitoring at each bus (e.g., $V_t$) in the system 10 is not common, though. Illustrative embodiments can make use of other controllable sources 14 to determine the voltage when buses connect multiple lines. FIG. 21 schematically shows using small signal testing in accordance with illustrative embodiments of the invention. As shown in the figure, two controllable sources share a common node n3. Controllable source 1 injects the test power signal 30 and the voltage variations are read by controllable source 2. When source 1 injects a test signal, then source 2 is used as a monitoring device for that node. In the case of large signal testing, the implementation is not direct because if the second source has some current output, then there will be some voltage drop ($\Delta V_{23}$) which is unknown at this point. However, in the small signal test case, if the test power signal ($\hat{P}$, $\hat{Q}$) has a specific frequency (i.e. the "carrier" sinusoidal signal on FIG. 18A) then we can know the exact voltage at n3 (for small signal analysis purposes).

By injecting a signal using the controllable source 1, we can construct the functions $f_1$ and $f_3$ at that operating point. If we then repeat the process but inject the signal through the second controllable source, we can obtain the function $f_2$ and validate the value for $f_3$ (or calculate it for some other operating point). This can be extended to a system with a larger number of buses and branches, as long as there is a path where a small test signal is not injected so that the voltage at a connecting node can be measured.

A further advantage of the small signal approach is that even if there are additional uncontrollable sources or loads that we are not directly measuring (but are creating power flows), the technique works just as well because the "carrier" small test signal can always be extracted from the voltage measurement.

The implementation of the small signal technique is made even faster in some embodiments by injecting test power signals by all controllable sources at the same time but using different frequencies that are not multiples of each other. For example, if controllable source 1 injects a small signal with a period of two seconds, and controllable source 2 injects with a period of three seconds, then they may be demodulated during the data processing part of the algorithm.

Figure 22:
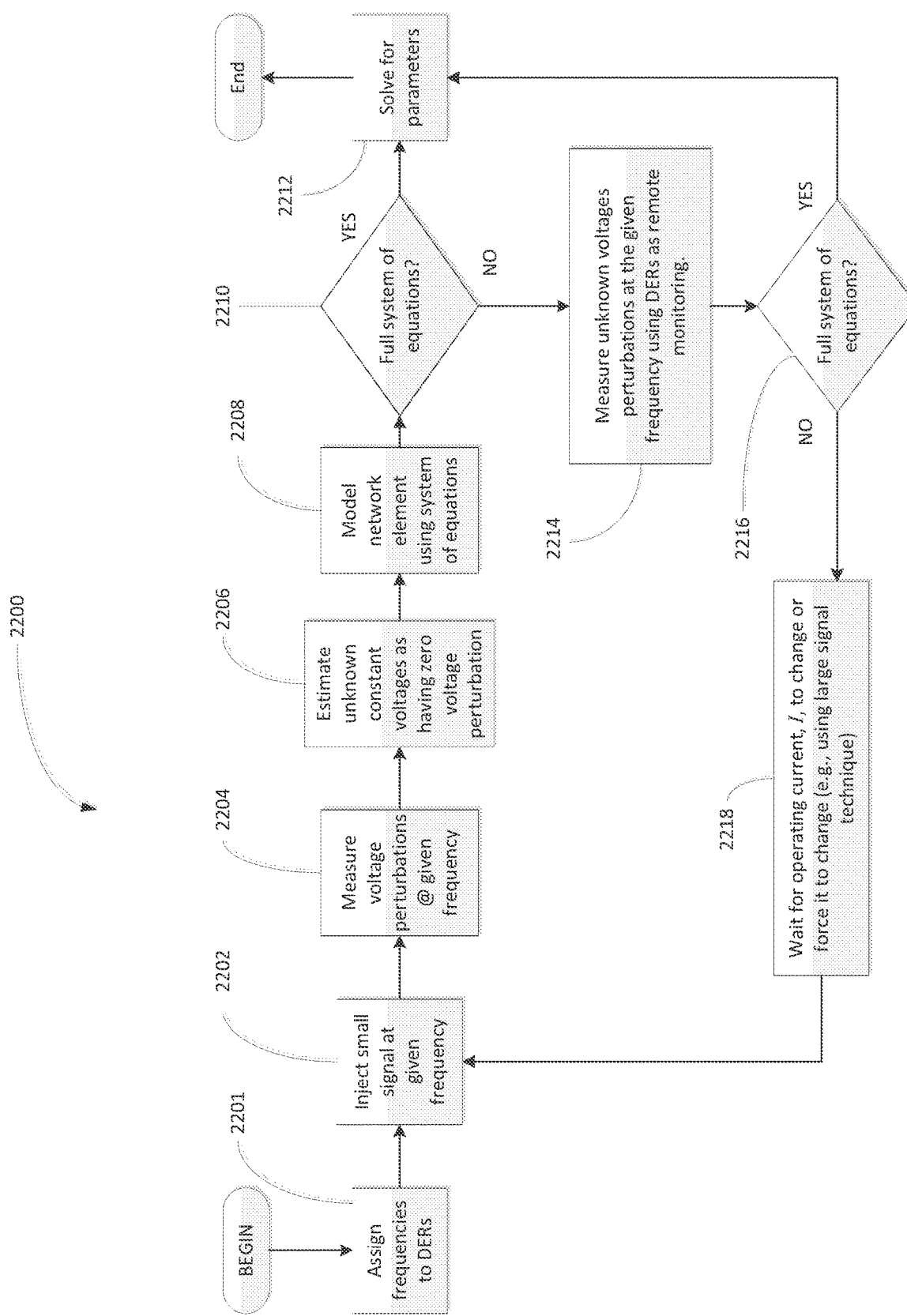
FIG. 22 schematically shows a process of estimating a physical characteristic of at least one network element using the physical characteristic analysis engine in accordance with illustrative embodiments of the invention.

FIG. 22 schematically shows a process of estimating a physical characteristic of at least one network element using the physical characteristic analysis engine 27 in accordance with illustrative embodiments of the invention. The process of FIG. 22 is substantially simplified from a longer process that may be used to determine network topology. Accordingly, the process can have many steps that those skilled in the art likely would use. In addition, some of the steps may be performed in a different order than that shown, or at the same time. Those skilled in the art therefore can modify the process as appropriate.

The process begins at step 2202, where the asset manager 16 instructs the controllable asset 14 to inject the small signal 30 into the DERs network. As described with reference to discovering the network topology, the small signal 30 is injected at a given frequency, and these instructions may come from the controller 18. Furthermore, in illustrative embodiments, the signal 30 is as small as possible depending on the controllability of the injected current and the voltage measurement sensitivity of the DERs in the system.

Figure 23:
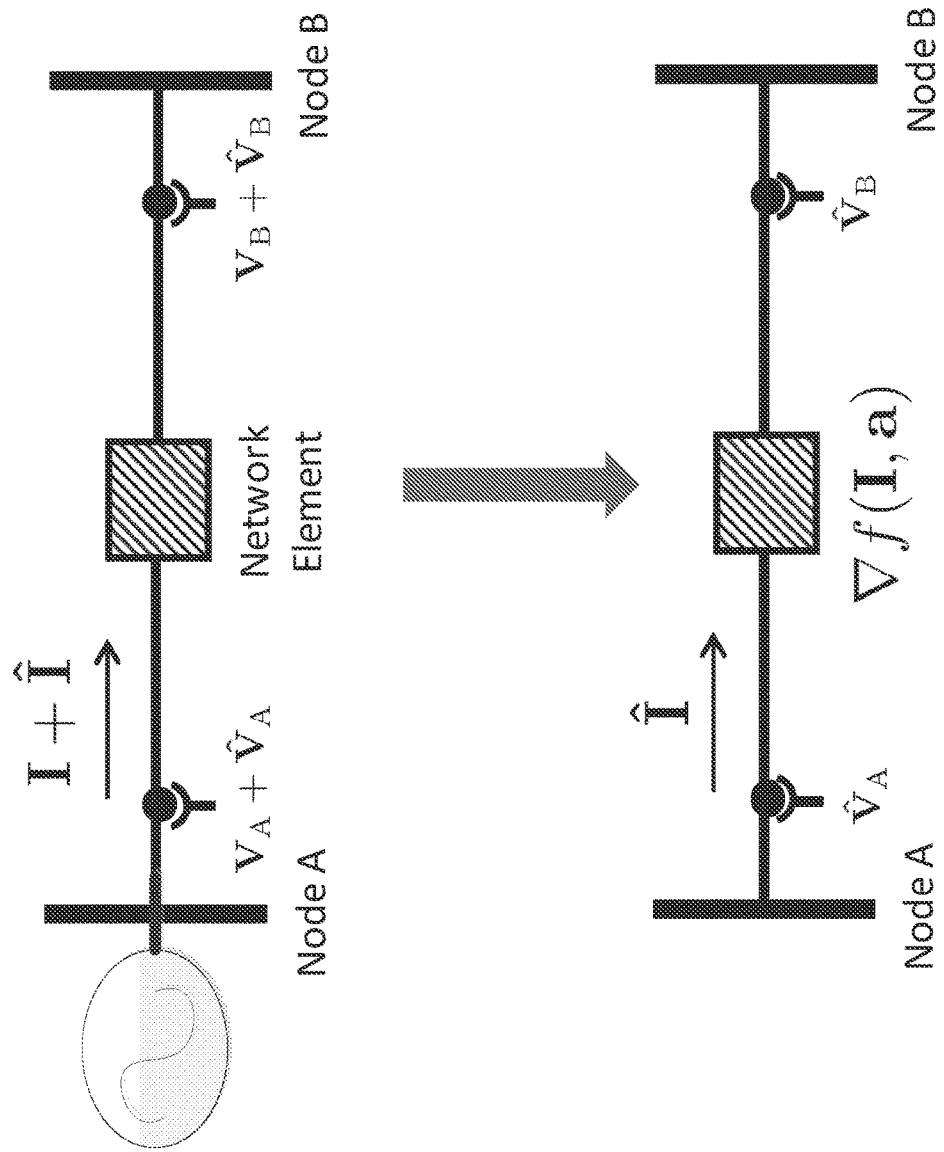
FIG. 23 schematically shows a small signal $\hat{I}$ injected by the controllable source 14 into the DERs network.

FIG. 23 schematically shows a small signal I injected by the controllable source 14 into the DERs network. During the normal operation of the controllable source 14, there is some normal operating current I running from Node A to Node B, a normal operating voltage at Node A (i.e., $V_A$), and a normal operating voltage at Node B (i.e., $V_B$). After the small test signal 30 (i.e., $\hat{I}$) is injected at step 2202, there is a corresponding voltage perturbation at Node A (i.e., $\hat{V}_A$) and at Node B (i.e., $\hat{V}_B$). The process then proceeds to step 2204, where the voltage perturbation is measured wherever possible. For example, in FIG. 23, the voltage perturbation is measured at Node A (i.e., $\hat{V}_A$) and at Node B (i.e., $\hat{V}_B$). Specifically, because the small test signal 30 has a particular frequency, the voltage perturbations are also at the given frequency. The characteristic analysis engine 27 may perform a Fourier transform on the measured voltage to obtain the voltage at the given frequency. In illustrative embodiments, each of the nodes has an asset with the voltmeter 22 that can measure voltage. Additionally, or alternatively, certain nodes may have dedicated monitoring systems.

The characteristic engine 27 performs a Taylor expansion and may ignore second order terms, which leads to the equation for small signal analysis. Because the small signal Î is small, second order terms and greater can be effectively ignored (e.g., the square of a small number is even smaller). The asset manager 16 at Node A instructs the other asset manager 16 at Node B to measure $V_B$. Thus, the parameters of the network element may be calculated by looking at the derivative of the function (or gradient in case there are multiple components of current). The generalized equation is:

$$\hat{V}_A - \hat{V}_B = \nabla f(I,a) \cdot \hat{I}$$

Where=$\nabla f(I, a)$ is the Jacobian, gradient or derivative (depending on the system) of the voltage drop-current function, evaluated at the operation point current.

Figure 24:
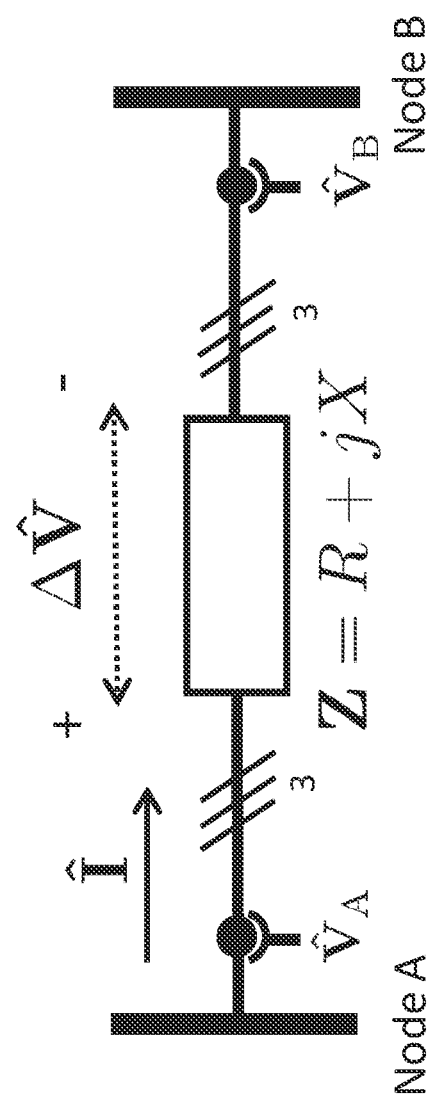
FIG. 24 schematically shows impedance as the physical characteristic of the network element.

The process then proceeds to step 2206, where the physical characteristic analysis engine 27 sets any unknown voltages at a node (e.g., unmeasured because of lack of voltmeter or monitor) that are constant, or approximately constant, as having zero voltage perturbation. FIG. 24 schematically shows impedance as the physical characteristic of the network element 32. For specific physical characteristics, such as impedance, the physical characteristic engine 27 prepares the mathematical model using the methods described above in combination with known impedance equations.

For example, if node B is constant and unknown, such as a stiff grid connection, then the voltage perturbation is not significant, and is set as $\hat{V}_B=0$. This simplifies the equations considerably, since the assumption that the voltage is constant means that the perturbation is zero. Because the perturbation value is known, measurement of an additional triplet is not required to solve the system of equations. In contrast, when using the large signal method, even if voltage was constant, its value was still required to compute all parameters.

Accordingly, the physical characteristic engine 27 sets the general equation for the voltage perturbation at node A as:

$$\hat{V}_A = \nabla f(I,a) \cdot \hat{I}$$

In the case where the voltage is constant, the system generates two equations from a single voltage measurement:

$$\hat{V}_{A,1}^{(1)} = R\hat{I}_1^{(1)} + X\hat{I}_2^{(1)}$$

$$\hat{V}_{A,2}^{(1)} = R\hat{I}_2^{(1)} - X\hat{I}_1^{(1)}$$

where the unknown parameters are a=[R, X], and the measured duplet is $S^{(i)} = [\hat{V}_A^{(i)}, \hat{I}^{(i)}]$.

The process then proceeds to step 2208, where the physical characteristic analysis engine 27 prepares the system of equations representing a mathematical model of the network element. As explained with reference to large signals, DERs frequently measure only some of the components of voltages and current. The most typical case is that they measure a magnitude of the voltage but not the phase. This affects the small signal technique as well, because the small variations of the voltage and current are per component. Similar to the large signal case, a function h(x) is defined that relates the measurement ($\hat{V}_{A,k}$) with the small signal components ($\hat{V}_{A,j}$): $h(\hat{V}_{A,j}) = \hat{V}_{A,k}$.

Using known impedance equations, the h(x) function, and 2 different small signal tests results in the following 6 equations:

$$\hat{V}_{A,1}^{(1)} - \hat{V}_{B,1}^{(1)} = R\hat{I}_1^{(1)} + X\hat{I}_2^{(1)}$$

$$\hat{V}_{A,2}^{(1)} - \hat{V}_{B,2}^{(1)} = R\hat{I}_2^{(1)} - X\hat{I}_1^{(1)}$$

$$\hat{V}_{A,1}^{(2)} - \hat{V}_{B,1}^{(2)} = R\hat{I}_1^{(2)} + X\hat{I}_2^{(2)}$$

$$\hat{V}_{A,2}^{(2)} - \hat{V}_{B,2}^{(2)} = R\hat{I}_2^{(2)} - X\hat{I}_1^{(2)}$$

$$|\hat{V}_A^{(1)}| = \frac{V_{A,1}^{(1)}}{|V_A^{(1)}|}\hat{V}_{A,1}^{(1)} + \frac{V_{A,2}^{(1)}}{|V_A^{(1)}|}\hat{V}_{A,2}^{(1)}$$

$$|\hat{V}_A^{(2)}| = \frac{V_{A,1}^{(2)}}{|V_A^{(2)}|}\hat{V}_{A,1}^{(2)} + \frac{V_{A,2}^{(2)}}{|V_A^{(2)}|}\hat{V}_{A,2}^{(2)}$$

where a=[R, X] are the unknown parameters, and the measured triplets are $S^{(i)} = [\hat{V}_A^{(i)}, \hat{V}_A^{(i)}, \hat{I}^{(i)}]$.

Frequently, DERs control power instead of current. Thus, in some embodiments, power signals are injected instead of current signals. As discussed previously, it is possible to relate power to current through the use of an additional equation. Similar to the large signal case, a function g(x) is defined that relates current and voltages to power. The equation is solved as with the basic algorithm. Thus, $$g(\hat{V}_A, \hat{V}_B, \hat{I}, V_A, V_B, I) = \hat{P}$$

Assuming that none of the voltages are constant, four equations are generated with 1 small signal test:

$$\hat{V}_{A,1}^{(1)} - \hat{V}_{B,1}^{(1)} = R\hat{I}_1^{(1)} + X\hat{I}_2^{(1)}$$

$$\hat{V}_{A,2}^{(1)} - \hat{V}_{B,2}^{(1)} = R\hat{I}_2^{(1)} - X\hat{I}_1^{(1)}$$

$$\hat{P}^{(1)} = V_{A,1}^{(1)}\hat{I}_1^{(1)} + I_1^{(1)}\hat{V}_{A,1}^{(1)} + V_{A,2}^{(1)}\hat{I}_2^{(1)} + I_2^{(1)}\hat{V}_{A,2}^{(1)}$$

$$\hat{Q}^{(1)} = V_{A,2}^{(1)}\hat{I}_1^{(1)} + I_1^{(1)}\hat{V}_{A,2}^{(1)} - V_{A,2}^{(1)}\hat{I}_2^{(1)} - I_2^{(1)}\hat{V}_{A,1}^{(1)}$$

where the unknown parameters are a=[R, X] and the measured triplet is $S^{(i)} = [\hat{V}_A^{(i)}, \hat{V}_B^{(i)}, \hat{P}^{(i)}]$.

Figure 25:
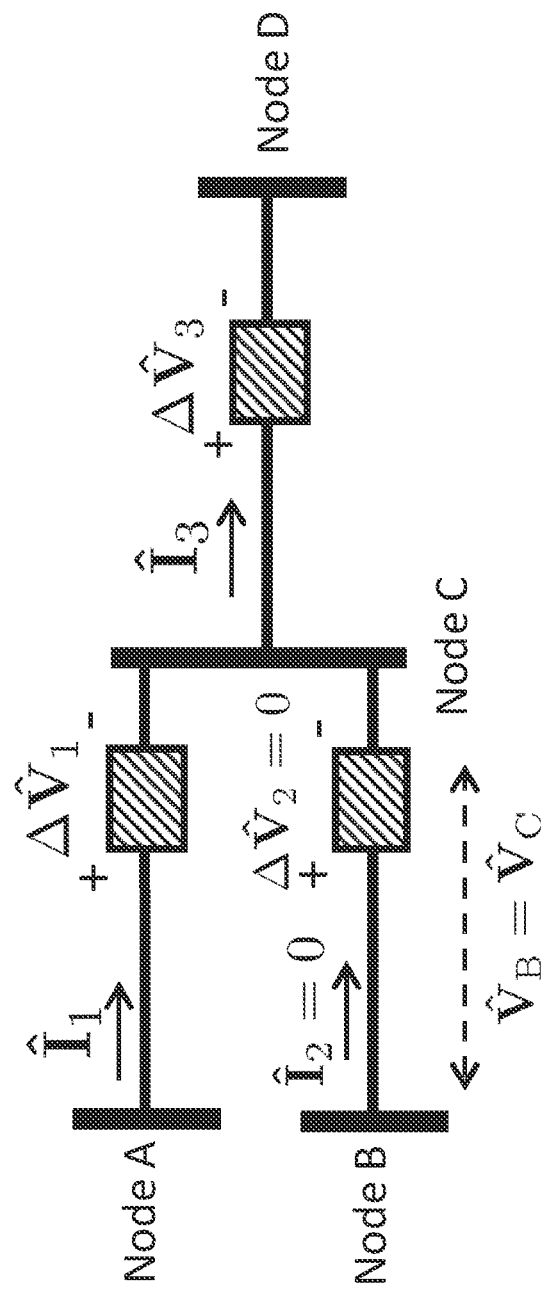
FIG. 25 schematically shows a diagram having three branches, in accordance with illustrative embodiments of the invention.

FIG. 25 schematically shows a diagram having three branches, in accordance with illustrative embodiments of the invention. When developing the system of equations for a system having more than one branch. The characteristic analysis engine 27 uses the basic algorithm for each branch independently. In illustrative embodiments having multiple branches, the DERs may inject signals at different frequencies that are not multiples of each other so that they may be treated independently. Thus, when analyzing a particular signal injection at a particular frequency, the other signal injections are treated as zero.

For example, if the DER at Node A injects a signal $I_1$ through a branch 1 at 11 Hz, and the DER at Node B injects another signal $I_2$ at 17 Hz, then the characteristic analysis engine 27 can analyze the system first with $I_1$ only (i.e. $I_2=0$) and then for $I_2$ only (i.e., $I_1=0$). Some embodiments use prime numbers for different test signal frequencies to prevent using frequencies that are multiples of each other.

Returning to FIG. 22, the process asks at step 2210 whether there is a full system of equations. If there is, the process proceeds to step 2212 and parameters are solved. The process then comes to an end. However, if there is not a full system of equations, then the process moves to step 2214. At step 2214, unknown voltage perturbations are measured using DERs as remote monitoring. For example, Node C voltage perturbation can be obtained by Node B ($\hat{V}_C = \hat{V}_B$). When the current signal through the network element is zero (i.e., $\hat{I}_{jk}=0$), the small signal voltage drop/perturbation is also zero (i.e., $\Delta\hat{V}_{jk}=0$) by definition. The small signal voltage measurements at edge nodes, where DERs are usually located, may be used as measurements of other nodes including mid-point nodes, where there is frequently no measurement devices. Thus, the voltage perturbation at midpoint nodes may be measured indirectly. $\hat{V}_C = \hat{V}_B$ The process then proceeds to step 2216, which again asks if there is a full system of equations. If there is, the process proceeds to step 2212, and the parameters of the equations are solved. If not, the process proceeds to step 2218, where the operating current, I, is changed, i.e., by waiting. Alternatively, the operating current of the system can be forced to change. This can be done by sending, for example, a large signal test as described previously. Then the process moves to step 2202, which injects the small signal at the new frequency.

Figure 26:
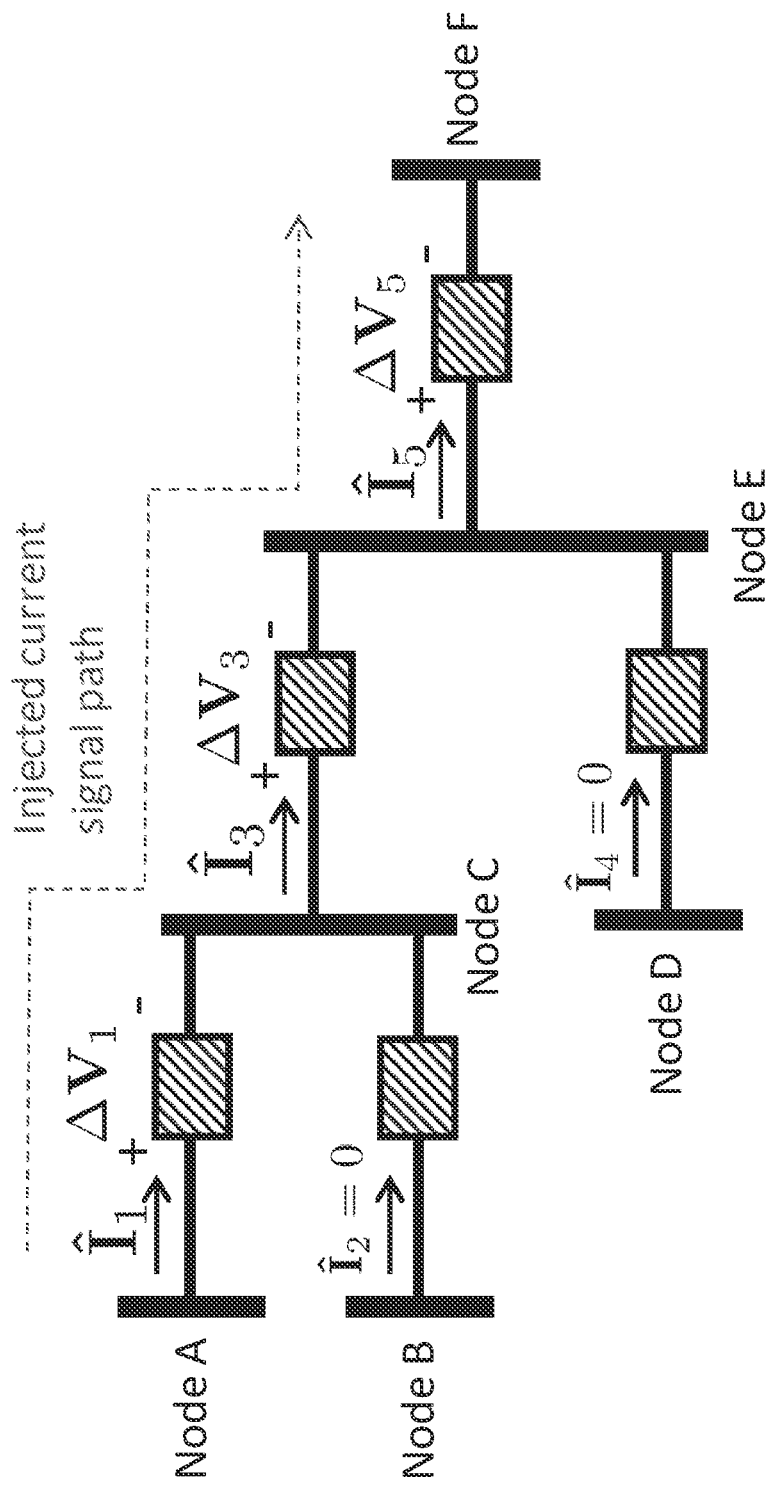
FIG. 26 schematically shows a system having a plurality of branches in accordance with illustrative embodiments of the invention.

FIG. 26 schematically shows a system having a plurality of branches in accordance with illustrative embodiments of the invention. In this example, the DER at Node A injects a current signal at a first given frequency. The DERs at Node B and Node C also inject a signal at a second and third given frequency that are not multiples of each other. Currents $I_2$ and $I_4$ can be made zero at the $I_1$ frequency (e.g., no current or a current that has a frequency that is not a multiple of the frequency of $I_1$), so that $I_3=I_5=I_1$. The DER at Node B may be used to measure the voltage perturbation at Node C ($\hat{V}_B = \hat{V}_C$), and DER at Node D is used to measure voltage perturbation at Node E ($\hat{V}_D = \hat{V}_E$). The system of equations is as follows:

$$\hat{V}_A - \hat{V}_C = \nabla f_1(I_1, a_1) \cdot \hat{I}_1$$

$$\hat{V}_C - \hat{V}_E = \nabla f_3(I_3, a_3) \cdot \hat{I}_3$$

$$\hat{V}_E = \nabla f_5(I_5, a_5) \cdot \hat{I}_5$$

The above described analysis may be repeated to find the parameters of branches 2 and 4.

Figure 27:
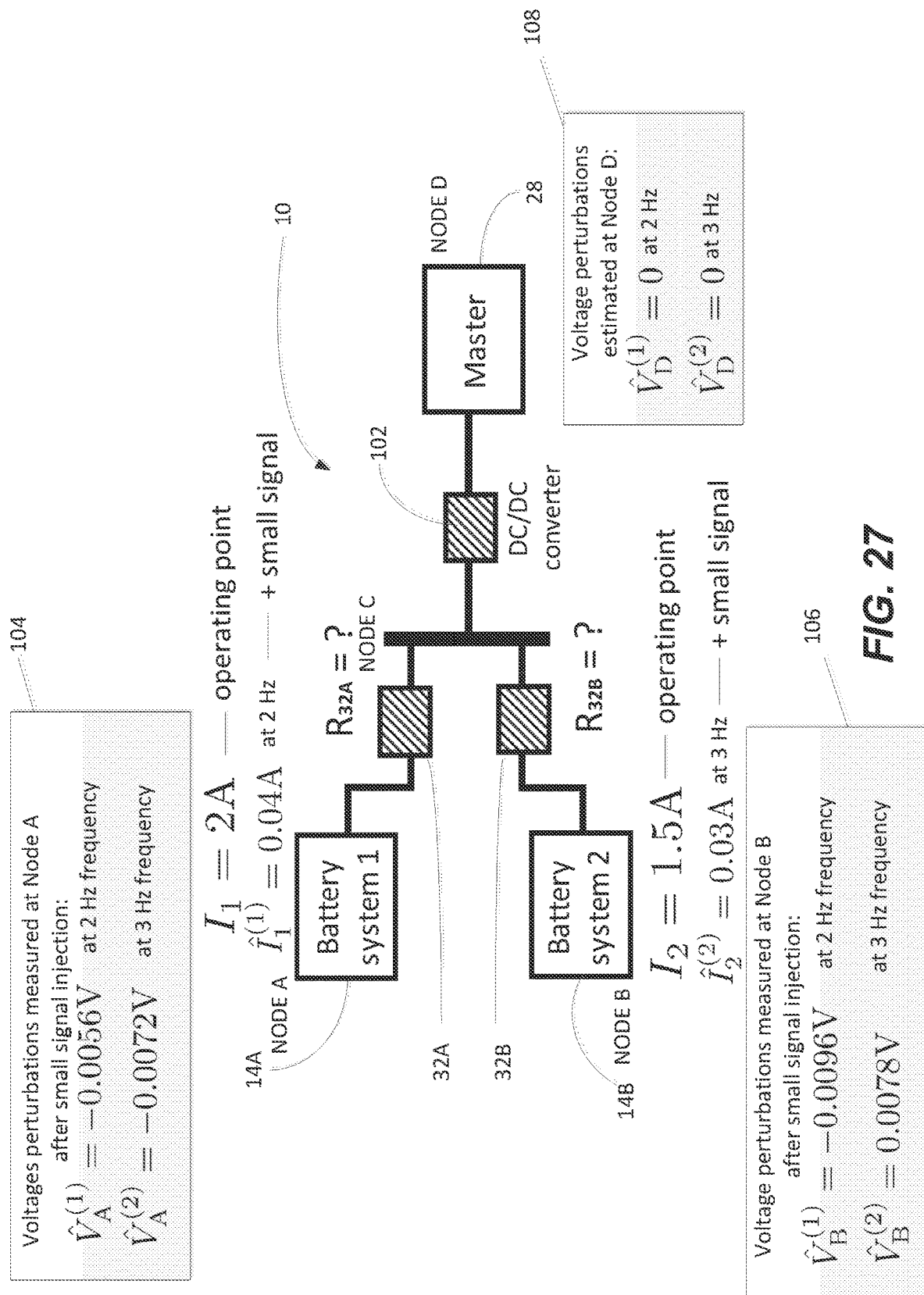
FIG. 27 schematically shows a DERs system using the small signal injection technique to estimate parameters of network elements in a DC microgrid in accordance with illustrative embodiments of the invention.

FIG. 27 schematically shows a DERs system using the small signal injection technique to estimate parameters of network elements in a DC microgrid 10 in accordance with illustrative embodiments of the invention. The microgrid 10 has two batteries 14A and 14B connected to a common node which in turn connects to the grid 28. Branch A, which includes the battery system 14A, has the network element 32A with an unknown resistance ($R_{32A}$). Branch B, which includes the battery system 14B, has the network element 32B with an unknown resistance ($R_{32B}$). Additionally the microgrid 10 also has a DC/DC converter 102, which converts the current from one voltage level to another.

In this example, the current injected by the battery system 14A during normal operation is 2 Amps, and the current injected by the battery system 14B during normal operation is 1.5 Amps. As discussed previously, the battery systems 14A and 14B may directly control current, or indirectly by injecting power. Equations exist and have been previously described that provide for the conversion of power to current.

At the beginning of the process 2200 described in FIG. 22, the resistances $R_{32A}$ and $R_{32B}$ are unknown. However, both of these parameters are determined by the characteristic analysis engine 27. As described earlier, the process begins at step 2201, where a frequency is assigned to a particular DER. In other words, each DER injects a test signal at a given frequency, so that voltage perturbations at the given frequency throughout the system can be attributed to the DER that injected the signal (e.g., 2 Hz injected current signal causes 2 Hz, or about 2 Hz, voltage perturbation—non-linear elements may cause the frequency to shift slightly). The DER preferably operates at a different frequency, and thus, just the test signal is output at the given frequency. For example, the battery 14A is assigned a frequency of 2 Hz for test signals, while the battery 14B is assigned a frequency of 3 Hz for test signals.

The process then proceeds to step 2202, where the small signal is injected. An advantage of the small signal technique described herein is that it may be injected during the normal operation of the system. As shown, both batteries are operational at the time of injection of the small signal. Specifically, the battery 14A outputs a current $I_1$ of 2 Amps, while the battery 14B outputs a current $I_2$ of 1.5 Amps.

The battery 14A injects a small signal $\hat{I}_1^{(1)}$ in addition to its normal operation. For example, the small signal may be 0.04 A at 2 Hz (i.e., $\hat{I}_1^{(1)} = 0.04$ A). Simultaneously, in series (e.g., immediately), and/or staggered (e.g., at some later time), the Battery 14B injects a small signal, which may be 0.03 A at 3 Hz for example (i.e., $\hat{I}_2^{(2)} = 0.03$ A). In some embodiments, preferably, the signals are injected at a time close to each other to ignore the effects of temperature.

The next step in the process 2204 measures voltage perturbations at the given frequencies. In this example, the batteries 14A and 14B measure voltages (and voltage perturbations), and the master has a constant voltage value that is not within the system's control. Thus, the asset managers 16 of the batteries 14A and 14B instruct the batteries to take voltage measurements using their respective voltmeters 22. As described previously, a Fourier transform may be used to determine voltage measurements at particular frequencies.

In this particular example, the battery 14A measured two different voltage perturbations 104 at Node A, one at 2 Hz and one at 3 Hz. In a similar manner, the battery 14B measured two different voltage perturbations 106 at Node B, one at 2 Hz and one at 3 Hz.

The next step 2206 in the process sets constant voltages as having zero voltage perturbation. Thus, the voltage perturbations 108 at Node D, which is connected to the master grid 28, can be assumed to be zero for all of the frequencies.

The next step 2208 models network elements using a system of equations shown in FIG. 29A. Two of the equations (3) and (6) are modeling the performance of the network characteristic of $R_{32A}$ and $R_{32B}$. Although a quadratic equation is used, a different equation (e.g., cubic or higher order) can be used to model the performance of the network characteristic. However, there might be some situations where a quadratic model is not a good fit, such as for a device that has a sharp threshold at which its voltage drops rapidly. Such cases could be handled by a piece-wise linear approach equation, instead of a quadratic equation.

Using the techniques described herein, at this point in the process, there are six unknowns (i.e., $R_1$, $R_2$, $a_1$, $a_2$, $V_C^{(1)}$, $V_C^{(2)}$) and only 5 independent equations. There are only 5 independent equations because the operation point was the same when the signals were injected (e.g., because equations 3 and 6 are linear combinations of each other since $I_3^{(1)} = I_3^{(2)}$. $R_1$, $R_2$, $a_1$, $a_2$, $V_C^{(1)}$, $V_C^{(2)}$ The process proceeds to step 2210, which asks if there is a full system of equations. Branch 1 and Branch 2 have a full system of equations, and thus, can be solved for $R_1$ and $R_2$ using by the characteristic analysis engine 27 with conventional methods. However, to find $a_1$ and $a_2$, the characteristic analysis engine 27 requires an additional measurement at a different operating point due to the two unknown parameters. Thus, because there is not a full system of equations, the process proceeds to step 2214. Because there are no unknown voltages that at midpoints that require using DERs as remote monitoring, the process proceeds to the next step 2218.

Figure 28:
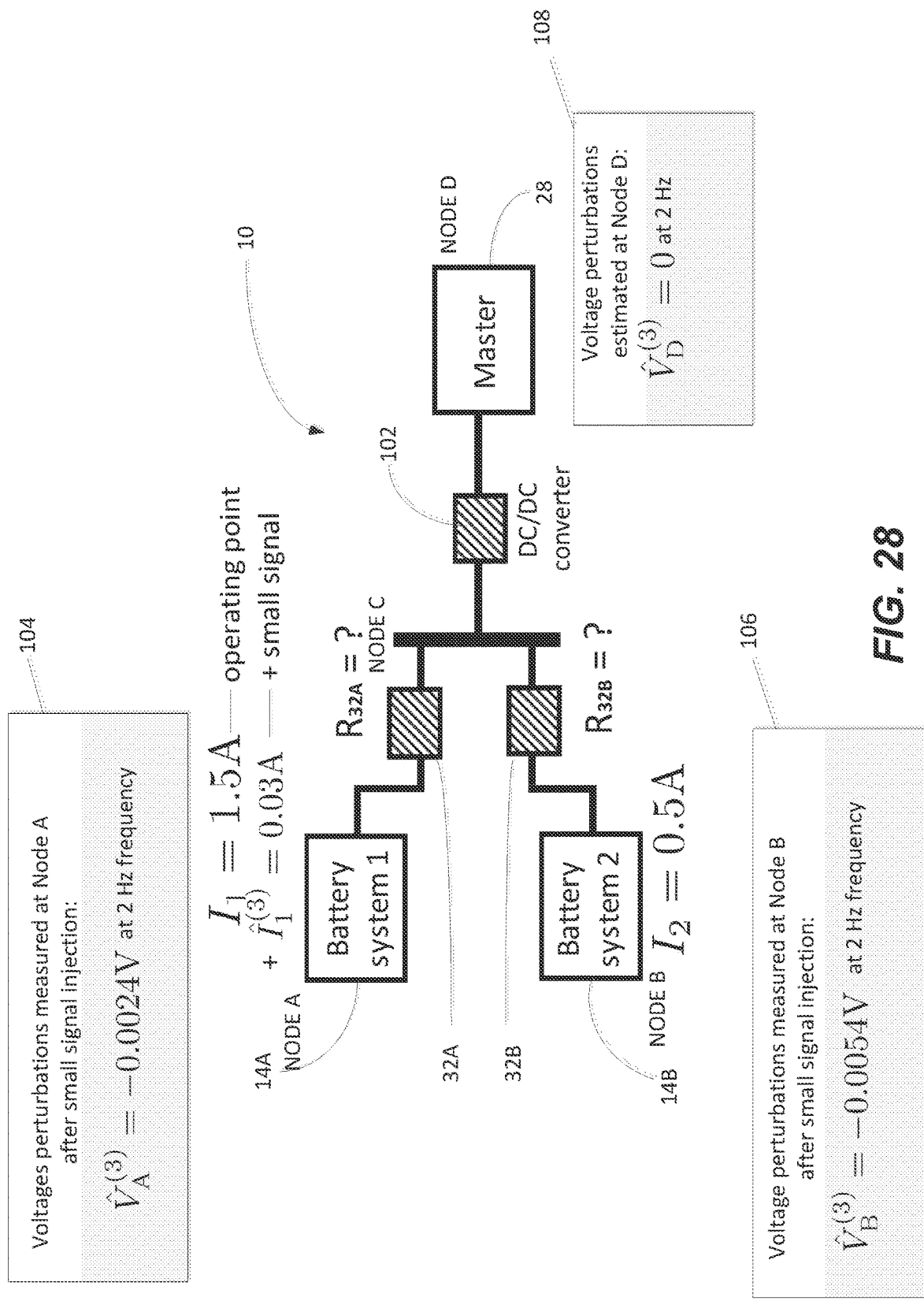
FIG. 28 schematically shows the example of FIG. 27 with new forced operating currents.

Step 2218 waits for the operating currents, I, to change, or forces it to change. In some embodiments, forcing the operating current to change may be accomplished by sending a large signal. Thus, the small signal and large signal techniques described herein may be used in combination. FIG. 28 schematically shows the example of FIG. 27 with new forced operating currents. Specifically, the operating current of battery 14A $I_1$ is changed to 1.5 Amps, and the operating current of battery 14B, $I_2$, is changed to 0.5 A. To effect this change, the characteristic analysis engine 27 may send a message to the controller 18 of the particular asset.

The process then loops back to step 2202, which requires inject the small signal at the given frequency now that there is a new operating current. For example, the battery 14A may inject a small signal $\hat{I}_1^{(3)}$ of 0.03 Amps at the given frequency, e.g., 2 Hz, in addition to the operating current $I_1$. The next step 2204 measures the voltage perturbations at the given frequency. Thus, asset manager 16 determines the voltage perturbations at node A($\hat{V}_A^{(3)}$) and at node B ($\hat{V}_B^{(3)}$) at 2 Hz. The process then proceeds to step 2206, where unknown constant voltages are set as having zero voltage perturbation. Accordingly, the perturbations at Node D($\hat{V}_D^{(3)}$) are set to zero.

The next step 2208 models the network elements 32 using the system of equations. FIG. 29B shows the equations constructed by the characteristic analysis engine 27 from the measured values. Equations (3) and (6) are solving for a1 and a2. Thus, the information is duplicative. Equations (1), (5), and (7) are impedance equations that are known in the art.

The next step 2210 asks whether there is a full system of equations. There are seven unknowns (i.e., $R_1$, $R_2$, $a_1$, $a_2$, $V_C^{(1)}$, $V_C^{(2)}$, $V_C^{(2)}$) and eight independent equations. Because the system of equations can now be solved (independent equations equal to or greater than unknowns), the process moves to step 2212, which solves for the unknown parameters.

FIG. 30 schematically shows the physical characteristic analysis engine solving the parameters of the equations obtained for the network elements in FIGS. 27-28. The characteristic analysis engine 27 calculates, $R_{32A}$ using equations (1) and (2), $R_{32B}$ using equations (4) and (5), a1 and a2 can be solved with equations (3) and (9). This is shown in FIG. 28. Accordingly, the process comes to completion.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. Such variations and modifications are intended to be within the scope of the present invention as defined by any of the appended claims.

Various innovations are limited immediately below, and those innovations may be combined to include one or more of the specified innovations:

1. An asset manager configured to control distribution of power within a distributed energy resources system ("DERs system"), the DERs system having a plurality of assets, the asset manager being configured to operate with a given asset in the DERs system, the asset manager comprising:

an interface configured to receive asset information relating to the given asset and to communicate with at least one a) other asset manager, b) central controller, and/or c) voltage monitor in the DERs system, wherein at least one other asset is configured to inject a power signal at a given frequency into the DERs system;

a voltmeter configured to measure voltage at the given frequency of the injected power signal;

a topology engine operatively coupled with the interface, the topology engine configured to:

determine a perturbation of voltage at the given frequency caused by the injected power signal, and a) construct the topology of the DERs system as a function of the differences of the magnitude of perturbations of each of the plurality of assets, or b) send information relating to the perturbation of voltage at the given frequency to a centralized controller where the topology of the DERs system is constructed as a function of the differences of the magnitude of perturbations of each of the plurality of assets.

2. The asset manager of innovation 1, wherein the DERs system is a microgrid.

3. The asset manager of innovation 1, wherein the DERs system is a microgrid, wherein the power signal is a small signal that is injected while the system is operating, the small signal being less than 10% of the steady state output power of a controllable asset that injects the signal at that particular time.

4. The asset manager of innovation 1, wherein the power signal has a frequency of less than about 1 kHz.

5. The asset manager of innovation 1, wherein the assets include a distributed energy resource and a load.

6. The asset manager of innovation 1, wherein the topology engine is further configured to perform a Fourier transform on the measured voltage to determine the magnitude of the perturbation of the voltage at the given frequency.

7. The asset manager of innovation 1, wherein the DERs system is connected to the grid and/or removably connectable to the grid.

8. A method of determining the topology of an aggregated distributed energy resources system ("DERs system"), the DERs system having a plurality of assets, at least one of the assets being a controllable asset, the method comprising:
   injecting a power signal at a given frequency from at least one of the controllable assets into the DERs system;
   measuring the voltage at each of the plurality of assets after injecting the power signal;
   determining the magnitude of perturbation of the voltage at the given frequency for each of the plurality of assets; and
   constructing the topology of DERs system as a function of the differences of the magnitude of perturbations of each of the plurality of assets.

9. The method of determining the topology of a DERs system of innovation 8, further comprising:
   injecting a second power signal, at a second given frequency, from a second controllable asset into the DERs system;
   measuring the voltage at each of the plurality of assets;
   determining the magnitude of perturbation of the voltage at the second given frequency for each of the plurality of assets; and
   refining the topology of the DERs system as a function of the differences of the magnitude of perturbations of each of the plurality of assets.

10. The method of determining the topology of a DERs system of innovation 9,
   wherein the power signal and the second power signal are sent simultaneously and have different frequencies.

11. The method of determining the topology of a DERs system of innovation 9,
   wherein the second power signal is a large signal.

12. The method of determining the topology of a DERs system of innovation 8,
   wherein the DERs system is a microgrid.

13. The method of determining the topology of the DERs system of innovation 8,
   wherein the power signal is a small signal that is injected while the DERs system is operating,
   the small signal being less than 10% of the steady state output power of the controllable asset that sends the signal at that particular time.

14. The method of determining the topology of the DERs system of innovation 8,
   wherein the power signal has a frequency of less than about 500 Hz.

15. The method of determining the topology of the DERs system of innovation 8,
   wherein the assets include a distributed energy resource and a load.

16. The method of determining the topology of the DERs system of innovation 8, further comprising:
   performing a Fourier transform on the measured voltage to determine the magnitude of the perturbation of the voltage at the given frequency.

17. The method of determining the topology of the DERs system of innovation 8,
   wherein a larger perturbation in a first asset indicates that the first asset is closer to the controllable asset than a second asset having a smaller perturbation.

18. The method of determining the topology of the DERs system of innovation 8,
   wherein the DERs system is connected to the grid and/or removably connectable to the grid.

19. The method of determining the topology of the DERs system of innovation 8,
   further comprising repeating the step of injecting power signals with a different controllable asset until the topology of all of the assets in the DERs system is determined.

20. The method of determining the topology of the DERs system of innovation 8, further comprising determining a physical characteristic of a network element in the DERs system as a function of the power signal and the measured voltage change.

21. A computer program product for use on a computer system for determining the topology of an aggregated distributed energy resources system ("DERs system"), the DERs system having a plurality of assets, at least one of the assets being a controllable asset, the computer program product comprising a tangible, non-transient computer usable medium having computer readable program code thereon, the computer readable program code comprising:
   program code for communicating with a plurality of asset managers to manage the assets, each asset including a local dedicated asset manager separate from the other asset managers, each asset manager having an interface to receive asset information relating to its asset;
   program code for causing the asset to inject a power signal at a given frequency into the DERs system;
   program code for causing the voltmeter to measure the voltage at the asset;
   program code for determining the magnitude of perturbation of the voltage at the given frequency for each of the plurality of assets; and
   program code for constructing the topology of the DERs system as a function of the differences of the magnitude of perturbations of each of the plurality of assets.

22. The program product of innovation 21, further comprising program code for causing a second asset to inject a power signal at a second given frequency into the DERs system;
   program code for causing the voltmeter to measure the voltage at the second asset;
   program code for determining the magnitude of perturbation of the voltage at the second given frequency for each of the plurality of assets; and
   program code for constructing the topology of the DERs system as a function of the differences of the magnitude of perturbations for the second given frequency at each of the plurality of assets.

23. The program product of innovation 21, wherein the DERs system is a microgrid.

24. The program product of innovation 21, wherein the power signal is a small signal that is injected while the system is operating,
   the small signal being less than 10% of the steady state output power of the DERs system at that particular time.

25. The program product of innovation 21, wherein the power signal has a frequency of less than about 1 kHz.

26. The program product of innovation 21, wherein the assets include a distributed energy resource and a load.

27. The program product of innovation 22, wherein the power signal and the second power signal are sent simultaneously and have different frequencies.

28. The program product of innovation 22, wherein the power signal and the second power signal are sent in series.

29. The program product of innovation 21, further comprising program code for performing a Fourier transform on the measured voltage to determine the magnitude of the perturbation of the voltage at the given frequency.

30. The program product of innovation 21, wherein a larger perturbation in a first asset indicates that the first asset is closer to the controllable asset than a second asset having a smaller perturbation.

31. The program product of innovation 21, wherein the DERs system is connected to the grid and/or removably connectable to the grid.

32. The program product of innovation 21, further comprising repeating the step of injecting power signals with a different controllable asset until the topology of all of the assets in the DERs system is determined.

33. The program product of innovation 21, further comprising program code for determining a physical characteristic of a network element in the DERs system as a function of the power signal and the measured voltage change.

34. A method of estimating a physical characteristic of a network element in a distributed energy resource system having a plurality of assets electrically connected by a plurality of network elements, the method comprising:
    injecting a small power or current signal at a given frequency from a given controllable asset into a given branch between two nodes in the DERs system;
    measuring the voltage perturbation i) magnitude, or ii) magnitude and phase of at the given frequency at both of the nodes;
    calculating the voltage drop across the network element at the given frequency as a result of the injected signal;
    estimating a physical characteristic of the network element as a function of the calculated voltage drop and the injected small power or current signal.

35. The method of estimating a physical characteristic of a network element of innovation 34, further comprising:
    injecting a second power signal, from a second controllable asset, at a second given frequency, into a second given network element between two assets in the DERs system;
    measuring the change in voltage across the second given network element between the two assets to produce a second measured voltage change;
    determining the physical characteristic of the second given network element as a function of the power signal and the measured voltage change.

36. The method of estimating a physical characteristic of a network element of innovation 34, wherein the injected signal is a large signal that is injected when the DERs system is not in operation, the large signal having a frequency of less than 1 kHz and being greater than 10% of the power rating of the controllable asset injecting the power signal.

37. The method of estimating a physical characteristic of a network element of innovation 34, wherein the injected signal is a small signal that is injected when the DERs system is in operation, the small signal having a frequency of less than 1 kHz and being less than 10% of the steady state output power of the given controllable asset.

38. The method of estimating a physical characteristic of a network element of innovation 34, wherein the DERs system is a microgrid, and the physical characteristic is impedance 39. The method of estimating a physical characteristic of a network element of innovation 34, wherein the second controllable asset is used to measure the voltage of a midpoint node.

40. The method of estimating a physical characteristic of a network element of innovation 34, wherein the network element is a transmission line and the physical characteristic is the length and size of the transmission line.

41. The method of estimating a physical characteristic of a network element of innovation 35, wherein the power signal and the second power signal are sent simultaneously and have different frequencies.

42. The method of estimating a physical characteristic of a network element of innovation 34, wherein the power signal is sent at a regular interval.

43. An asset manager configured to control distribution of power within a DERs system having a plurality of assets, the asset manager being configured to operate with a given asset in the DERs system, the asset manager comprising:
    an interface configured to receive asset information relating to the given asset and to communicate with at least one a) other asset manager, b) central controller, and/or c) voltage monitor in the DERs system across a given network element, wherein at least one other asset is configured to inject a power signal at a given frequency into the given network element;
    a voltmeter configured to measure the change in voltage across the given network element at the given frequency;
    a physical characteristic analysis engine configured to determine the physical characteristic of the network element as a function of the power signal and the measured voltage.

44. The asset manager of innovation 43, wherein the injected power signal is a small signal that is injected when the DERs system is in operation, the small signal having a frequency of less than 1 kHz and being less than 10% of the steady state output power of the given controllable asset that injects the small signal at that particular time.

45. The asset manager of innovation 43, wherein the DERs system is a microgrid.

46. The asset manager of innovation 43, wherein the physical characteristic is impedance.

47. The asset manager of innovation 43, wherein the physical characteristic is the length and size of the network element.

48. The asset manager of innovation 43, wherein the power signal is sent at a regular interval.

49. A computer program product for use on a computer system for distributing power from a DERs system having a plurality of assets, the computer program product comprising a tangible, non-transient computer usable medium having computer readable program code thereon, the computer readable program code comprising:
    program code for communicating with a plurality of asset managers to manage the assets, each asset including a local dedicated asset manager separate from the other asset managers, each asset manager having an interface to receive asset information relating to its asset;
    program code for causing the asset to inject a power signal at a given frequency into a given network element between two assets in the DERs system;
    program code for causing the voltmeter to measure the change in voltage across the given network element between the assets; and
    program code for causing the physical characteristic analysis engine to determine a physical characteristic of the network element as a function of the power signal and the measured voltage change.

50. The computer program product of innovation 49, further comprising:

program code for causing the asset to inject a second power signal, at a second given frequency, into a second given network element between two assets in the DERs system;

program code for causing the voltmeter to measure the change in voltage across the given network element between the two assets to produce a second measured voltage change;

program code for causing the physical characteristic analysis engine to determine the physical characteristic of the second given network element as a function of the power signal and the measured voltage change.

51. The computer program product of innovation 49, wherein the injected signal is a small signal that is injected when the DERs system is in operation, the small signal having a frequency of less than 1 kHz and being less than 10% of the steady state output power of the given controllable asset at that particular time.

52. The computer program product of innovation 49, wherein the DERs system is a microgrid.

53. The computer program product of innovation 49, wherein the physical characteristic is impedance.

54. The computer program product of innovation 49, wherein the network element is a transmission line and the physical characteristic is the length and size of the network element.

55. The computer program product of innovation 50, wherein the power signal and the second power signal are sent simultaneously and have different frequencies.

56. The computer program product of innovation 49, wherein the power signal is sent at a regular interval.

57. The computer program product of innovation 49, wherein the timing of the regular interval is coordinated with temperature so that the effect of temperature on the network element can be estimated.

58. The computer program product of innovation 49, further comprising program code for causing the voltmeter of a second controllable asset to measure the voltage at a midpoint node.

What is claimed is:

1. A method of estimating a physical characteristic of a network element in a distributed energy resource system having a plurality of assets electrically connected by a plurality of network elements, the method comprising:
   injecting a large power or current signal from a given controllable asset into the DERs system, the large signal having a frequency of less than 1 kHz and being greater than 10% of the power rating of the controllable asset injecting the power signal;
   measuring a voltage perturbation:
      i) magnitude, or
      ii) magnitude and phase at the given frequency,
      at two nodes in the DERs system;
   calculating the voltage drop across the network element at the given frequency as a result of the injected signal;
   estimating a physical characteristic of the network element as a function of the calculated voltage drop and the injected signal.

2. The method of estimating a physical characteristic of a network element of claim 1, further comprising:
   injecting a second power signal, from a second controllable asset, at a second given frequency, into a second given network element between two assets in the DERs system;
   measuring the change in voltage across the second given network element between the two assets to produce a second measured voltage change;
   determining the physical characteristic of the second given network element as a function of the power signal and the measured voltage change.

3. The method of estimating a physical characteristic of a network element of claim 1, wherein the injected signal is a large signal that is injected when the DERs system is not in operation, the large signal having a frequency of less than 1 kHz and being greater than 10% of the power rating of the controllable asset injecting the power signal.

4. The method of estimating a physical characteristic of a network element of claim 1, wherein the injected signal is a small signal that is injected when the DERs system is in operation, the small signal having a frequency of less than 1 kHz and being less than 10% of the steady state output power of the given controllable asset.

5. The method of estimating a physical characteristic of a network element of claim 1, wherein the DERs system is a microgrid, and the physical characteristic is impedance.

6. The method of estimating a physical characteristic of a network element of claim 1, wherein the second controllable asset is used to measure the voltage of a midpoint node.

7. The method of estimating a physical characteristic of a network element of claim 1, wherein the network element is a transmission line and the physical characteristic is the length and size of the transmission line.

8. The method of estimating a physical characteristic of a network element of claim 2, wherein the power signal and the second power signal are sent simultaneously and have different frequencies.

9. The method of estimating a physical characteristic of a network element of claim 1, wherein the power signal is sent at a regular interval.

10. A system for estimating a physical characteristic of a network element in a distributed energy resource system having a plurality of assets electrically connected by a plurality of network elements, the system comprising:
    a controllable asset for injecting a large power or current signal into a DERs system, the large signal having a frequency of less than 1 kHz and being greater than 10% of the power rating of the controllable asset injecting the power signal;
    a sensor for measuring a voltage perturbation:
       i) magnitude, or
       ii) magnitude and phase at the given frequency,
       at two nodes in the DERs system; and
    a processor for:
       calculating the voltage drop across the network element at the given frequency as a result of the injected signal; and
       estimating a physical characteristic of the network element as a function of the calculated voltage drop and the injected signal.

11. The system of claim 10, further comprising:
    a second controllable asset injecting a second power signal at a second given frequency, into a second given network element between two assets in the DERs system;
    the processor further configured for:
       measuring the change in voltage across the second given network element between the two assets to produce a second measured voltage change; and
       determining the physical characteristic of the second given network element as a function of the power signal and the measured voltage change.

12. The system of claim 10, wherein the injected signal is a large signal that is injected when the DERs system is not in operation, the large signal having a frequency of less than 1 kHz and being greater than 10% of the power rating of the controllable asset injecting the power signal.

13. The system of claim 10, wherein the injected signal is a small signal that is injected when the DERs system is in operation, the small signal having a frequency of less than 1 kHz and being less than 10% of the steady state output power of the given controllable asset.

14. The system of claim 10, wherein the DERs system is a microgrid, and the physical characteristic is impedance.

15. The system of claim 10, wherein the second controllable asset is used to measure the voltage of a midpoint node.

16. The system of claim 10, wherein the network element is a transmission line and the physical characteristic is the length and size of the transmission line.

17. The system of claim 11, wherein the power signal and the second power signal are sent simultaneously and have different frequencies.

18. The system of claim 10, wherein the power signal is sent at a regular interval.

* * * * *